United States Patent
Ham et al.

(10) Patent No.: US 11,710,481 B2
(45) Date of Patent: Jul. 25, 2023

(54) ELECTRONIC DEVICE AND METHOD FOR PROVIDING CONVERSATIONAL SERVICE

(71) Applicant: SAMSUNG ELECTRONICS CO., LTD., Suwon-si (KR)

(72) Inventors: Jina Ham, Suwon-si (KR); Kangwook Lee, Suwon-si (KR); Soofeel Kim, Suwon-si (KR); Yewon Park, Suwon-si (KR); Wonjong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 722 days.

(21) Appl. No.: 16/797,339

(22) Filed: Feb. 21, 2020

(65) Prior Publication Data
US 2021/0065705 A1    Mar. 4, 2021

(30) Foreign Application Priority Data

Aug. 26, 2019 (KR) .................. 10-2019-0104573

(51) Int. Cl.
*G10L 15/22* (2006.01)
*G10L 15/30* (2013.01)
(Continued)

(52) U.S. Cl.
CPC ............ *G10L 15/22* (2013.01); *G06V 40/172* (2022.01); *G10L 15/02* (2013.01);
(Continued)

(58) Field of Classification Search
CPC .. G06F 16/3329; G06F 16/3346; G06F 40/30; G06V 40/172; G10L 15/02;
(Continued)

(56) References Cited

U.S. PATENT DOCUMENTS

| 10,210,267 B1 | 2/2019 | Lloyd et al. |
| 2013/0031476 A1 | 1/2013 | Coin et al. |

(Continued)

FOREIGN PATENT DOCUMENTS

| EP | 3495943 | 6/2019 |
| KR | 10-2011-0060039 | 6/2011 |

(Continued)

OTHER PUBLICATIONS

International Search Report and Written Opinion dated Jun. 9, 2020 in corresponding International Application No. PCT/KR2020/002972.

(Continued)

*Primary Examiner* — Angela A Armstrong
(74) *Attorney, Agent, or Firm* — Nixon & Vanderhye P.C.

(57) ABSTRACT

A method, performed by an electronic device, of providing a conversational service includes: receiving an utterance input; identifying a temporal expression representing a time in a text obtained from the utterance input; determining a time point related to the utterance input based on the temporal expression; selecting a database corresponding to the determined time point from among a plurality of databases storing information about a conversation history of a user using the conversational service; interpreting the text based on information about the conversation history of the user, the conversation history information being acquired from the selected database; generating a response message to the utterance input based on a result of the interpreting; and outputting the generated response message.

18 Claims, 26 Drawing Sheets

(51) Int. Cl.
  *G10L 15/02*      (2006.01)
  *G10L 15/197*     (2013.01)
  *G10L 15/18*      (2013.01)
  *G10L 15/25*      (2013.01)
  *G06V 40/16*      (2022.01)

(52) U.S. Cl.
  CPC ........ *G10L 15/1815* (2013.01); *G10L 15/197* (2013.01); *G10L 15/25* (2013.01); *G10L 15/30* (2013.01); *G10L 2015/025* (2013.01); *G10L 2015/223* (2013.01)

(58) Field of Classification Search
  CPC ............. G10L 15/1815; G10L 15/1822; G10L 15/197; G10L 15/22; G10L 15/25; G10L 15/30; G10L 2015/025; G10L 2015/223
  See application file for complete search history.

(56) References Cited

U.S. PATENT DOCUMENTS

| | | | |
|---|---|---|---|
| 2013/0275164 A1* | 10/2013 | Gruber | ................... G10L 17/22 705/5 |
| 2015/0228276 A1 | 8/2015 | Baldwin et al. | |
| 2016/0132342 A1 | 5/2016 | Yang et al. | |
| 2016/0379107 A1 | 12/2016 | Li et al. | |
| 2017/0177715 A1 | 6/2017 | Chang et al. | |
| 2017/0372200 A1* | 12/2017 | Chen | ....................... G10L 15/22 |
| 2018/0232201 A1* | 8/2018 | Holtmann | ............... H04R 1/406 |
| 2018/0308487 A1 | 10/2018 | Goel et al. | |
| 2019/0095750 A1 | 3/2019 | Kawase et al. | |

FOREIGN PATENT DOCUMENTS

| | | |
|---|---|---|
| KR | 10-2019-0037669 | 4/2019 |
| WO | 2018/213415 | 11/2018 |

OTHER PUBLICATIONS

Extended European Search Report dated Jul. 21, 2022 in corresponding EP Patent Application No. 20856788.3.
"Robots dish out ramen at Tokyo restaurant", Nikkei Asian Review, https://asia.nikkei.com/Business/Robots-dish-out-ramen-at-Tokyo-restaurant , Feb. 26, 2017, 4 pages.
Cook, Meet Sota: This AI-powered robot will recommend a tasty bowl of ramen at new Seattle restaurant, https://www.geekwire.com/2017/meet-sota-ai-powered-robot-will-recommendtasty-bowl-ramen-new-seattle-restaurant , Aug. 5, 2017, 11 pages.
AI Robot Waiter Can Suggest a Ramen for you at a Seattle Ramen Restaurant, https://electronics360.globalspec.com/article/11515/ai-robot-waiter-can-suggesta-ramen-for-you-at-a-seattle-ramen-restaurant , Mar. 30, 2018, 2 pages.

\* cited by examiner

FIG. 4A
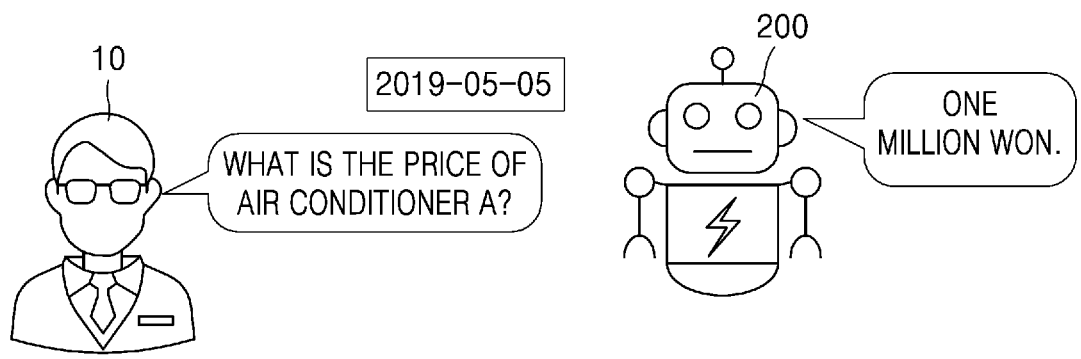
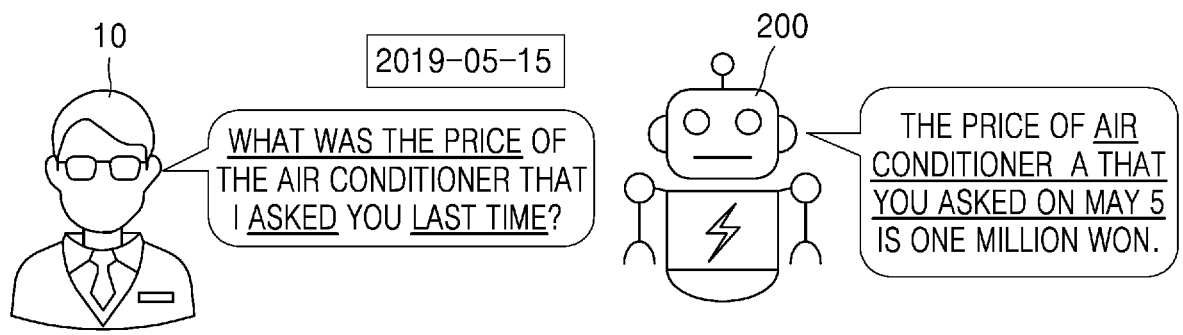

FIG. 4B
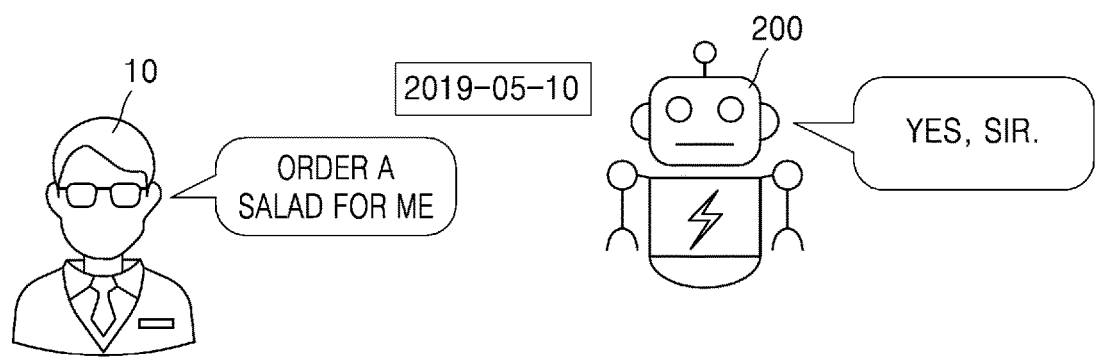
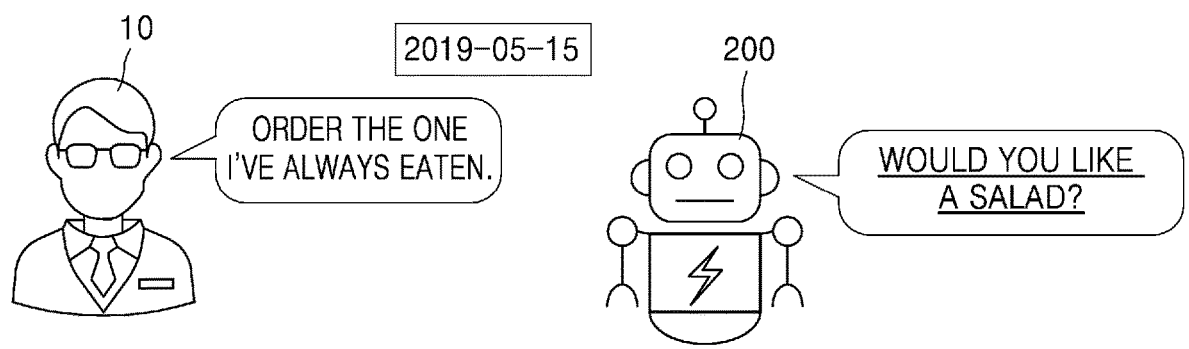

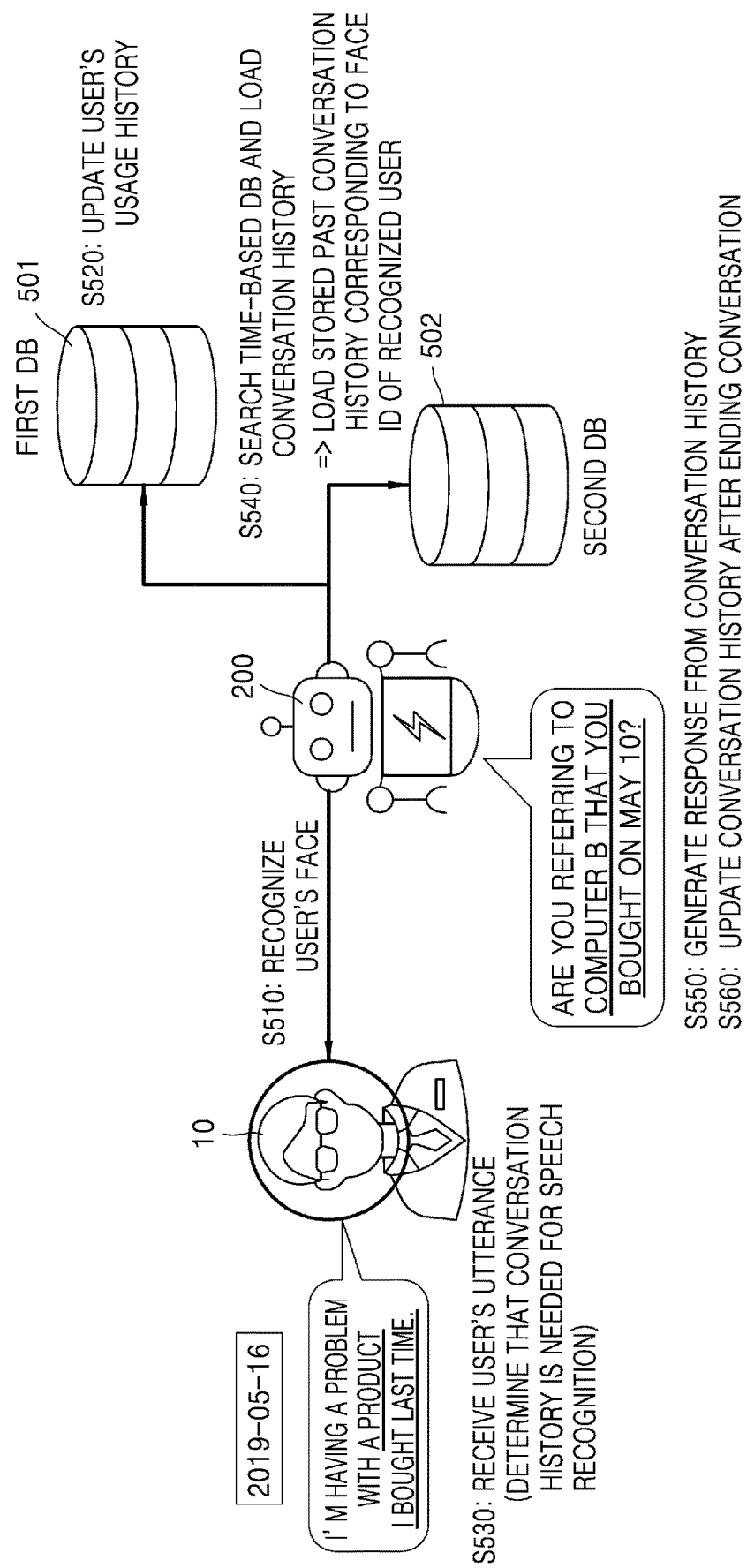

ELECTRONIC DEVICE AND METHOD FOR PROVIDING CONVERSATIONAL SERVICE

CROSS-REFERENCE TO RELATED APPLICATION

This application is based on and claims priority under 35 U.S.C. § 119 to Korean Patent Application No. 10-2019-0104573, filed on Aug. 26, 2019, in the Korean Intellectual Property Office, the disclosure of which is incorporated by reference herein in its entirety.

BACKGROUND

Field

The disclosure relates to electronic devices and methods for providing a conversational service, and for example, to methods and devices for interpreting a user's utterance input based on a user's conversation history and outputting a response message.

Description of Related Art

With recent developments in electronic devices, such as smartphones, for performing various functions in a complex manner, electronic devices equipped with a speech recognition function have been launched to improve operability. A speech recognition technology may be applied to a conversational user interface for outputting a response message to a question input by a user's voice in an everyday, natural language to provide a user-friendly conversational service.

The conversational user interface refers to an intelligent user interface that operates while talking in a user's language. The conversational user interface may be used in a question answering (QA) system for outputting an answer to a user's question. The QA system differs from an information retrieval technique used to simply retrieve and present as list information related to a user's question in that the QA system searches for and provides an answer to the user's question.

For example, personal electronic devices such as smartphones, computers, personal digital assistants (PDAs), portable multimedia players (PMPs), smart home appliances, navigation devices, wearable devices, etc., may provide conversational services by connecting to a server or executing an application.

As another example, public electronic devices such as unattended guide information terminals, unattended kiosks, unmanned checkout counters, etc., installed in stores or public institutions may also provide conversational services. Public electronic devices installed in public places need to store and use a conversation history for each user in order to accurately analyze a user's utterance input and provide a personalized answer thereto.

When using a device for providing a conversational service to multiple users, a method is required which is capable of receiving an accurate personalized answer from the device even when the user makes an utterance related to a past conversation history.

SUMMARY

Embodiments of the disclosure provide a method and device for providing a conversational service by performing a process of retrieving a stored conversation history associated with a user account in a more user-friendly manner.

Additional aspects will be set forth in part in the description which follows and, in part, will be apparent from the description.

According to an example embodiment of the disclosure, a method, performed by an electronic device, of providing a conversational service includes: receiving an utterance input identifying a temporal expression representing a time in a text obtained from the utterance input; determining a time point related to the utterance input based on the temporal expression; selecting a database corresponding to the determined time point from among a plurality of databases storing information about a conversation history of a user using the conversational service; interpreting the text based on information about the conversation history of the user, the conversation history information being acquired from the selected database; generating a response message to the utterance input based on a result of the interpreting; and outputting the generated response message.

According to another example embodiment of the disclosure, an electronic device configured to provide a conversational service includes: a memory storing one or more instructions; and at least one processor configured to execute the one or more instructions to provide the conversational service to the user, wherein the at least one processor is further configured to execute the one or more instructions to control the electronic device to: receive an utterance input; identify a temporal expression representing a time in a text obtained from the utterance input; determine a time point related to the utterance input based on the temporal expression; select a database corresponding to the determined time point from among a plurality of databases storing information about a conversation history of a user using the conversational service; interpret the text based on information about the conversation history of the user, the conversation history information being acquired from the selected database; generate a response message to the utterance input based on a result of the interpreting; and output the generated response message.

According to another example embodiment of the disclosure, one or more non-transitory computer-readable recording media have stored therein a program for performing a method of providing a conversational service, the method including: receiving an utterance input; identifying a temporal expression representing a time in a text obtained from the utterance input; determining a time point related to the utterance input based on the temporal expression; selecting a database corresponding to the determined time point from among a plurality of databases storing information about a conversation history of a user using the conversational service; interpreting the text based on information about the conversation history of the user, the conversation history information being acquired from the selected database; generating a response message to the utterance input based on a result of the interpreting; and outputting the generated response message.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 4A is a diagram illustrating an example in which an electronic device provides a conversational service based on a conversation history, according to an embodiment of the disclosure;

FIG. 4B is a diagram illustrating an example in which an electronic device provides a conversational service based on a conversation history, according to an embodiment of the disclosure;

FIG. 5 is a diagram illustrating an example process, performed by an electronic device, of providing a conversational service, according to an embodiment of the disclosure;

DETAILED DESCRIPTION

Figure 1:
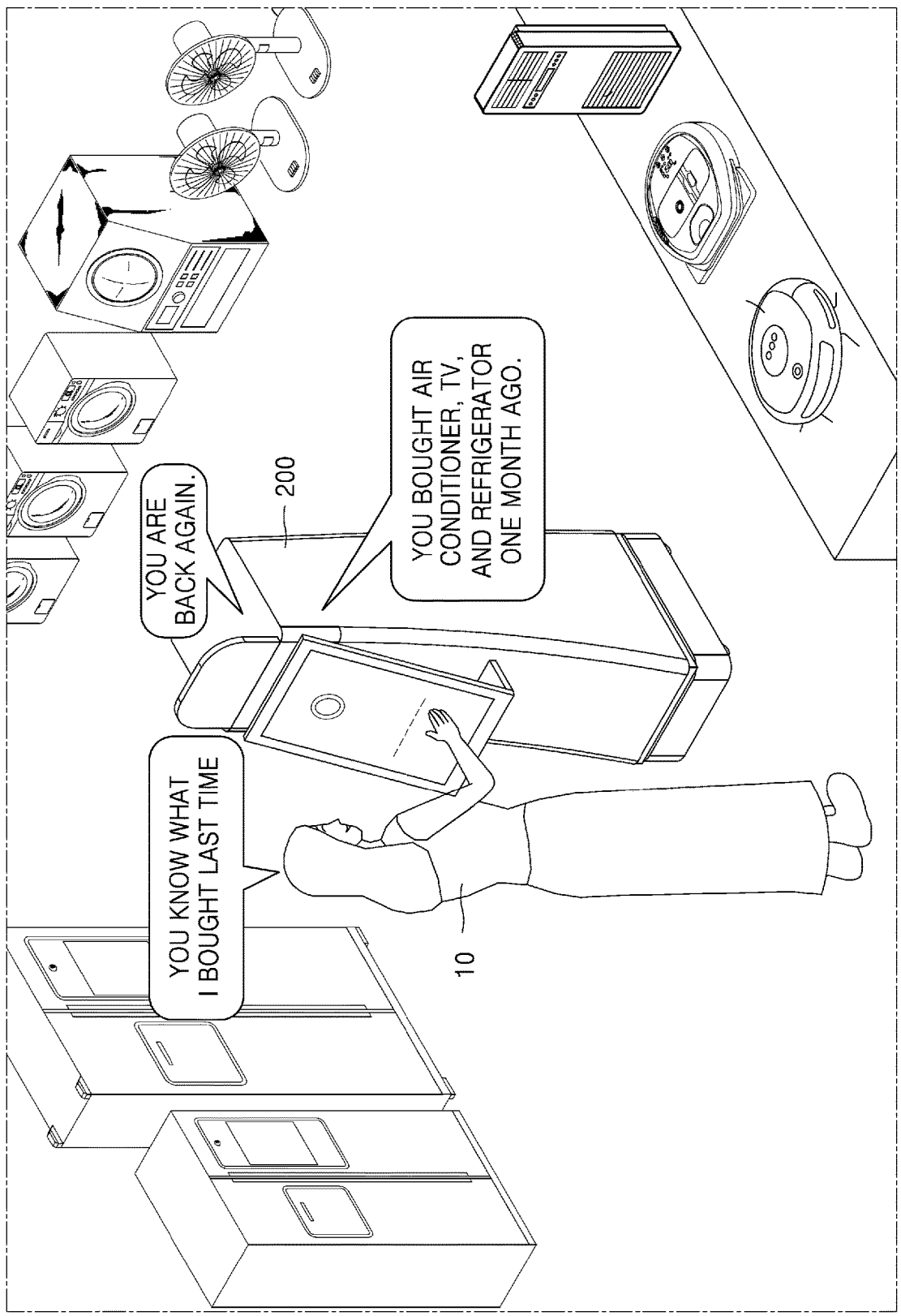
FIG. 1 is a diagram illustrating an example in which an electronic device provides a conversational service based on a conversation history, according to an embodiment of the disclosure.

Various example embodiments of the disclosure will now be described in greater detail below with reference to the accompanying drawings. However, embodiments of the disclosure may have different forms and should not be understood as being limited to the various example embodiments set forth herein. In addition, parts not related to the disclosure may be omitted to clarify the description of the disclosure, and like reference numerals in the drawings denote like elements throughout.

Throughout the disclosure, the expression "at least one of a, b or c" indicates only a, only b, only c, both a and b, both a and c, both b and c, all of a, b, and c, or variations thereof.

Some embodiments of the disclosure may be described in terms of functional block components and various processing steps. All or some of the functional blocks may be implemented using any number of hardware and/or software components configured to perform the specified functions. For example, the functional blocks of the disclosure may be implemented by one or more microprocessors or circuit components for performing predetermined functions. Furthermore, for example, the function blocks of the disclosure may be implemented with various programming or scripting languages. The functional blocks may be implemented in algorithms that run on one or more processors. Furthermore, the disclosure may employ techniques of the related art for electronics configuration, signal processing, and/or data processing.

Furthermore, connecting lines or connectors between elements shown in the figures are merely intended to represent example functional relationships and/or physical or logical couplings between the elements. It should be noted that many alternative or additional functional relationships, physical connections or logical connections may be present in a practical device.

Various example embodiments of the disclosure will be described in greater detail below with reference to the accompanying drawings.

In general, a device for providing a conversational service to a plurality of users may manage conversations on a per-user account basis or on a per-one-time session basis without identifying a user. A session may refer, for example, to a period of time from the start to the end of a conversational service for performing speech recognition on a user's query and outputting a response thereto.

Generally, in a case wherein the device manages conversations on a per-user account basis, a user needs to register his or her account by inputting user information such as a user ID or name. Furthermore, each time the user uses the device, the user may suffer the inconvenience of having to enter the user information and retrieve his or her account.

To reduce the user inconvenience, a device that manages conversations on a per-one-time session basis without identifying the user may be used. In a case wherein the device manages conversations on a per-one-time session basis, when a user's utterance input is received after termination of a session, the device starts a new session and provides a conversational service without information about a history of previous conversations. Thus, when the user asks, after the start of the new session, a question related to details of a conversation that he or she had with the device during a previous session, the device may not provide an accurate response to the user's question.

To address the above problems, the disclosure provides a method, performed by an electronic device, of storing a conversation history for each user by automatically identifying a user without the user needing to register his or her account, and utilizing the conversation history to create a response.

FIG. 1 is a diagram illustrating an example where a user 10 visited a store a month ago and purchased an air conditioner, a TV, and a refrigerator through an electronic device 200. According to an embodiment of the disclosure, the electronic device 200 may automatically perform face-based user authentication when the user 10 simply approaches the electronic device 200 without entering user information for user authentication. The electronic device 200 may start a conversational service via face-based user authentication without a user's separate command.

According to an embodiment of the disclosure, the electronic device 200 may check that a face ID of the user 10 is stored by recognizing a user's face and determine that the user 10 has used the conversational service. The electronic device 200 may output a voice message "You are back again," based on a user's service usage history.

According to an embodiment of the disclosure, when a face ID matching the user's face is not found, the electronic device 200 may determine that the user 10 has never used the conversational service. When it is determined that the user 10 is using the conversational service for the first time, the electronic device 200 may output a voice message "Welcome to the first visit." According to an embodiment of the disclosure, the electronic device 200 may output a customer response message suitable for a situation based on the user's service usage history.

As shown in FIG. 1, the user 10 may utter a request "You know what I bought last time," in relation to products that the user 10 purchased via the electronic device 200 previously, e.g., one month ago.

Because an electronic device of the related art that manages conversations on a per-one-time session basis does not store the contents of past conversations with the user 10, the electronic device may not ensure the continuity of conversation or provide an appropriate response message even when the user 10 makes an utterance related to the content of his or her past utterance.

On the other hand, the electronic device 200 according to an example embodiment of the disclosure may interpret an utterance by the user 10 based on his or her past conversation history to thereby output a response message based on the past conversation history.

For example, as shown in FIG. 1, the electronic device 200 may output a response message "You bought an air conditioner, a TV, and a refrigerator one month ago. Which of the products are you referring to?", based on a conversation history related to the products that the user 10 purchased via the electronic device 200 one month ago. According to an embodiment of the disclosure, when it is determined that the user's past conversation history is needed to interpret the user's utterance, the electronic device 200 may interpret the user's utterance based on the user's past conversation history matched to a recognized user's face for storage and generate a response message based on an interpretation result.

Figure 2A:
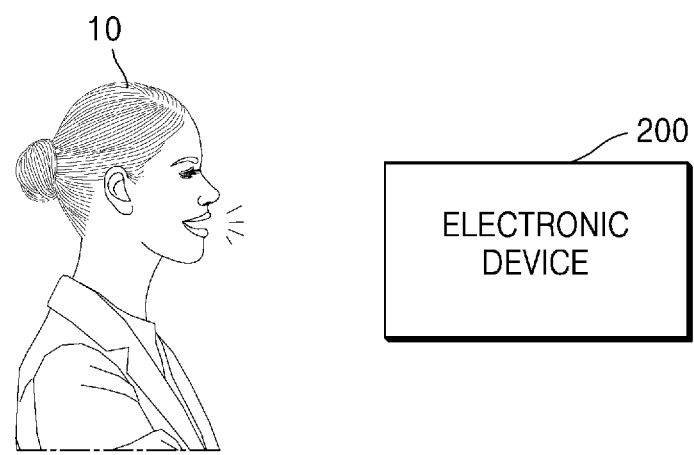
FIG. 2A is a diagram illustrating an example system for providing a conversational service according to an embodiment of the disclosure.
Figure 2B:
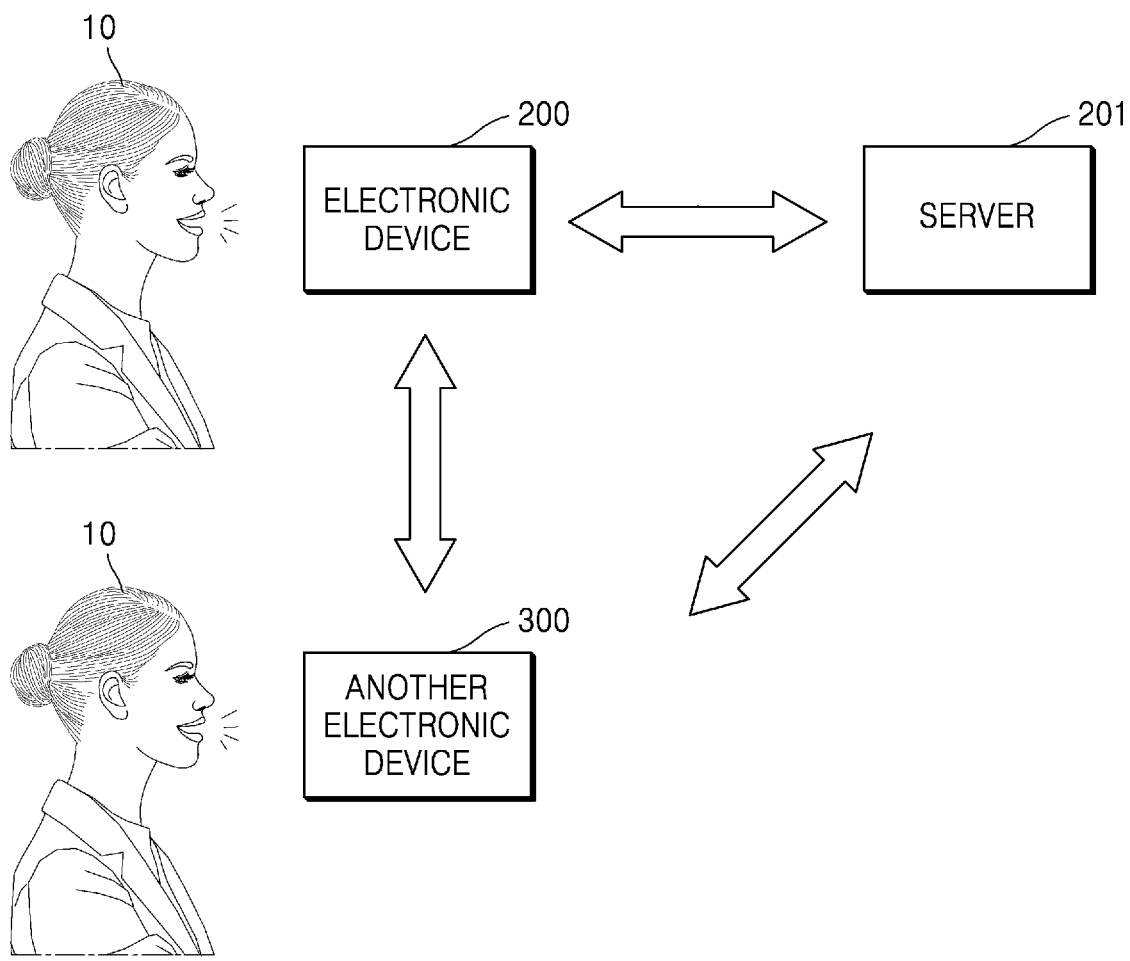
FIG. 2B is a diagram illustrating an example system for providing a conversational service according to an embodiment of the disclosure.

FIG. 2A is a diagram illustrating an example system for providing a conversational service according to an embodiment of the disclosure, and FIG. 2B is a diagram illustrating an example system for providing a conversational service according to an embodiment of the disclosure.

As shown in FIG. 2A, according to an embodiment of the disclosure, an electronic device 200 may be used alone to provide a conversational service to a user 10. Examples of the electronic device 200 may include, but are not limited to, home appliances such as a TV, a refrigerator, a washing machine, etc., a smartphone, a PC, a wearable device, a PDA, a media player, a micro server, a global positioning system (GPS), an electronic book terminal, a digital broadcasting terminal, a navigation device, a kiosk, an MP3 player, a digital camera, other mobile or non-mobile computing devices, or the like. The electronic device 200 may provide a conversational service by, for example, executing a chatbot application or a conversational agent application, etc.

According to an embodiment of the disclosure, the electronic device 200 may receive an utterance input by the user 10 and generate and output a response message to the received utterance input.

According to an embodiment of the disclosure, the electronic device 200 may provide a method of storing a conversation history for each user by automatically identifying the user 10 without the user 10 needing to register an account and using the conversation history for generating a response.

For example, according to an embodiment of the disclosure, the electronic device 200 may recognize a user's face via a camera and search for a face ID matching the recognized face from among stored face IDs. The electronic device 200 may retrieve a conversation history and a conversational service usage history mapped to a found face ID. The electronic device 200 may provide a conversational service to the user 10 based on the conversation history and update the conversation history after ending a conversation with the user 10.

According to an embodiment of the disclosure, when there is no face ID that matches the recognized face from among the stored face IDs, the electronic device 200 may check with the user 10 whether to store information related to the user's face. When the user 10 agrees to store his or her face ID, the electronic device 200 may map a conversation history and a service usage history to his or her face ID for storage after the conversation with the user 10 ends.

According to an embodiment of the disclosure, in managing the stored face ID and the conversation history, the electronic device 200 may designate a maximum storage period during which the face ID and the conversation history can be stored, based on the fact that a memory capacity is limited and personal information needs to be protected. When the maximum storage period elapses, the electronic device 200 may delete the stored face ID and the conversation history. However, when the user 10 is re-recognized (e.g., when the user 10 revisits the store) before the maximum storage period elapses, the electronic device 200 may extend and flexibly manage the storage period. The electronic device 200 may designate a different storage period of information for each user, depending on an interval at which and the number of times the user 10 uses a conversational service.

According to an embodiment of the disclosure, when it is determined that a past conversation history and a service usage history are needed to interpret a user's question, the electronic device 200 may generate and output a response message based on a conversation history for the user 10.

The electronic device 200 may receive the user's utterance input and determine a context related to a time contained in the utterance input. The context related to the time contained in the utterance input may refer, for example, to information related to the time necessary for generating a response according to a user's intention included in the utterance input. The electronic device 200 may determine, based on a result of the determining of the context, which conversation history information is to be used from among information about a conversation history accumulated over a first period and information about a conversation history accumulated over a second period. Accordingly, the electronic device 200 may reduce the amount of time required to interpret the user's question and provide an appropriate response by identifying the context of the conversation based on only selected conversation history information.

Furthermore, as shown in FIG. 2B, according to an embodiment of the disclosure, the electronic device 200 may provide a conversational service in conjunction with another electronic device 300 and/or a server 201. The electronic device 200, the other electronic device 300, and the server 201 may be connected to one another by wire or wirelessly.

The other electronic device 300 or the server 201 may share data, resources, and services with the electronic device 200, perform control of the electronic device 200 or file management, or monitor the entire network. For example, the other electronic device 300 may be a mobile or non-mobile computing device.

The electronic device 200 may generate and output a response message to the user's utterance input through communication with the other electronic device 300 and/or the server 201.

As shown in FIGS. 2A and 2B, according to an embodiment of the disclosure, the system for providing a conversational service may include at least one electronic device and/or a server. For convenience of description, a method, performed by an "electronic device", of providing a conversational service will be described hereinafter. However, some or all of the operations of the electronic device to be described below may also be performed by another electronic device and/or a server connected to the electronic device and may be partially performed by a plurality of electronic devices.

Figure 3:
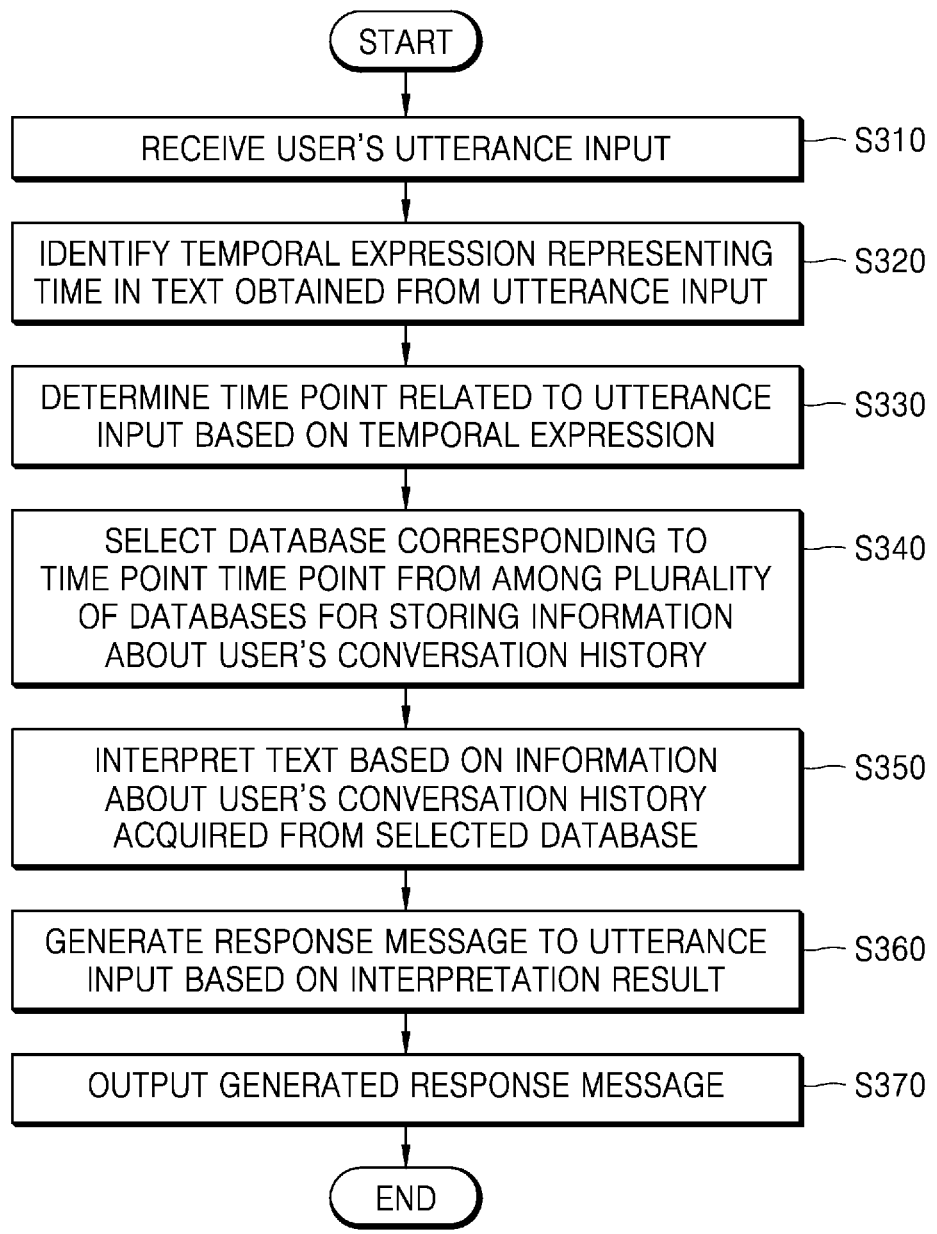
FIG. 3 is a flowchart illustrating an example method, performed by an electronic device, of providing a conversational service, according to an embodiment of the disclosure.

FIG. 3 is a flowchart illustrating an example method, performed by the electronic device 200, of providing a conversational service, according to an embodiment of the disclosure.

According to an embodiment of the disclosure, the electronic device 200 may receive a user's utterance input (operation S310).

According to an embodiment of the disclosure, the electronic device 200 may start a conversational service and receive a user's utterance input. According to an embodiment of the disclosure, the electronic device 200 may start a conversational service when a user approaches the electronic device 200 within a certain distance from the electronic device 200, when a speech signal of a predetermined intensity or higher is received, and when a speech signal for uttering a predesignated activation word is received.

According to an embodiment of the disclosure, the electronic device 200 may obtain a user's face image when the user approaches the electronic device 200 within a certain distance and determine whether a face ID matching the obtained user's face image is stored by searching a database. It will be understood that any suitable means of recognizing the user may be used and that the disclosure is not limited to face ID recognition. For example, and without limitation, voice recognition, biometric identification, input to a user interface, or the like may be used, and face ID is used for ease and convenience of explanation and illustration. The electronic device 200 may start the conversational service based on a determination result.

According to an embodiment of the disclosure, when the face ID matching the obtained user's face image is stored in the database, the electronic device 200 may update a stored service usage history mapped to the face ID. Otherwise, when the face ID matching the obtained user's face image is not stored in the database, the electronic device 200 may generate a new face ID and a service usage history mapped to the new face ID.

According to an embodiment of the disclosure, the electronic device 200 may receive and store an audio signal including a user's utterance input via a microphone. For example, the electronic device 200 may receive and store an utterance input in units of a sentence by detecting the presence or absence of a human speech using Voice Activation Detection (VAD), End Point Detection (EPD), etc.

According to an embodiment of the disclosure, the electronic device 200 may identify a temporal expression representing a time obtained from the user's utterance input (e.g., text) (operation S320).

The electronic device 200 may obtain a text by performing speech recognition on the user's utterance input and determine, as a temporal expression, an entity representing at least one of a time point, a duration, or a period included in the text. However, it will be understood that determining the temporal expression is not limited to obtaining and analyzing a text.

The entity may include at least one of a word, a phrase, or a morpheme having a specific meaning, which is included in the text. The electronic device 200 may identify at least one entity in the text and determine which domain includes each entity according to the meaning of the at least one entity. For example, the electronic device 200 may determine whether the entity identified in the text is an entity representing, for example, and without limitation, a person, an object, a geographical area, a time, a date, or the like.

According to an embodiment of the disclosure, the electronic device 200 may determine, as a temporal expression, for example, and without limitation, an adverb, an adjective, a noun, a word, a phrase, etc., representing a time point of an operation or state indicated by the text or representing a time point, a time, a period, etc. included in the text.

The electronic device 200 may perform embedding for mapping the text to a plurality of vectors. By applying a bidirectional long short-term memory (LSTM) model to the mapped vectors, the electronic device 200 may assign a beginning-inside-outside (BIO) tag to at least one morpheme representing at least one of a time point, a duration, or a period included in the text. The electronic device 200 may identify an entity representing a time in the text, based on the BIO tag. The electronic device 200 may determine the identified entity as a temporal expression.

According to an embodiment of the disclosure, the electronic device 200 may determine a time point related to the user's utterance input based on the temporal expression (operation S330).

The time point related to the user's utterance input may, for example, be a time point when information necessary for the electronic device 200 to generate a response according to an intention in the user's utterance is generated, a time point when a user's past utterance input including the information was received, or a time point when the information was stored in a conversation history. The time point related to the user's utterance input may include a time point when a user's past utterance including information for specifying the content of the user's utterance input was received or stored. For example, the time point related to the user's utterance input may include a time point when a past utterance was received or stored, the past utterance being related to a user's purchase, reference, query, and service request for a product mentioned in the user's utterance input.

The electronic device 200 may predict probability values, e.g., probabilities that the temporal expression indicates each of a plurality of time points. The electronic device 200 may determine a time point corresponding to a highest probability value from among the predicted probability values as being the time point related to the user's utterance input.

According to an embodiment of the disclosure, the electronic device 200 may select a database corresponding to the time point related to the user's utterance input from among a plurality of databases for storing information about a conversation history for a user who uses a conversational service (operation S340). On the other hand, a single database may be used, and the disclosure is not limited to multiple databases.

The plurality of databases may include a first database for storing information about a user's conversation history accumulated before a preset time point and a second database for storing information about a user's conversation history accumulated after the preset time point. The electronic device 200 may select the first database when the time point related to the user's utterance input is before the preset time point. The electronic device 200 may select the second database when the time point related to the user's utterance input is after the preset time point. In addition, the first database included in the databases may be stored in an external server while the second database may be stored in the electronic device 200.

According to an embodiment of the disclosure, the preset time point may be one of time points when at least some of information about a user's conversation history included in the second database is transmitted to the first database, when a user's face image is obtained, and when a conversational service starts.

According to an embodiment of the disclosure, the electronic device 200 may interpret the text based on information about a user's conversation history acquired from the selected database (operation S350).

The electronic device 200 may determine an entity that is included in the text and needs to be specified. The electronic device 200 may acquire specification information for specifying the determined entity by retrieving the information about the user's conversation history acquired from the selected database. The electronic device 200 may interpret the text and the specification information using, for example, and without limitation, a natural language understanding (NLU) model, or the like.

The information about the user's conversation history acquired from the database may include, for example, and without limitation, a past utterance input received from the user, a past response message provided to the user, information related to the past utterance input and the past response message, etc. For example, the information related to the past utterance input and the past response message may include an entity included in the past utterance input, content included in the past utterance input, a category of the past utterance input, a time point when the past utterance input was received, an entity included in the past response message, content included in the past response message, a time point when the past response message was output, information about situations before and after the past utterance input was received, and a user's product of interest, emotions, payment information, voice characteristics, etc., which are determined based on the past utterance input and the past response message.

According to an embodiment of the disclosure, the electronic device 200 may generate a response message to the received user's utterance input based on an interpretation result (operation S360).

The electronic device 200 may, for example, and without limitation, determine a type of a response message by applying a dialog manager (DM) model to the interpretation result. The electronic device 200 may generate a response message of the determined type using, for example, and without limitation, a natural language generation (NLG) model.

According to an embodiment of the disclosure, the electronic device 200 may output the generated response message (operation S370). For example, the electronic device 200 may output a response message in the form of at least one of a voice, a text, or an image.

According to an embodiment of the disclosure, the electronic device 200 may share at least one of a user's face ID, a service usage history, or a conversation history with another electronic device. For example, the electronic device 200 may transmit the user's face ID to another electronic device after the conversational service provided to the user ends. When the user desires to receive a conversational service via another electronic device, the other electronic device may identify the user and request information about a user's conversation history from the electronic device 200 based on a determination that the identified user corresponds to the received user's face ID. In response to the request received from the other electronic device, the electronic device 200 may transmit to the other electronic device information about a user's conversation history stored in the second database included in the databases.

FIG. 4A is a diagram illustrating an example in which an electronic device 200 provides a conversational service based on a conversation history, according to an embodiment of the disclosure, and FIG. 4B is a diagram illustrating an example in which the electronic device 200 provides a conversational service based on a conversation history, according to an embodiment of the disclosure.

FIG. 4A is a diagram illustrating an example in which the electronic device 200 is an unmanned kiosk in a store that sells electronic products, according to an embodiment of the disclosure. A kiosk may refer, for example, to an unmanned information terminal installed in a public place. Referring to FIG. 4A, on May 5, 2019, the electronic device 200 may receive an utterance input by a user 10 who asks what the price of air conditioner A is. The electronic device 200 may output a response message informing the price of air conditioner A in response to the user's utterance input.

On May 15, 2019, the electronic device 200 may receive an utterance input by the user 10 who revisits the store. The electronic device 200 may obtain a text stating "What was the price of the air conditioner that I asked you last time?" via speech recognition on the user's utterance input. The electronic device 200 may identify temporal expressions in the obtained text, such as "last time", "asked" and "what was the price". The electronic device 200 may determine that a user's conversation history is needed to interpret the obtained text based on the identified temporal expressions.

The electronic device 200 may determine an entity that needs to be specified in the text and acquire specification information for specifying the entity based on the user's conversation history. The electronic device 200 may interpret the text in which the entity is specified using an NLU model.

According to an embodiment of the disclosure, the electronic device 200 may determine an entity representing a category of a product in the text and specify the product based on conversation history information. For example, as shown in FIG. 4A, the electronic device 200 may determine "air conditioner" as an entity representing a category of a product entity in the user's utterance "What was the price of the air conditioner that I asked you last time?". The electronic device 200 may determine that the product whose price the user desires to know is "air conditioner A", based on the conversation history dated May 5. The electronic device 200 may output a response message informing the price of the air conditioner A in response to the user's question.

FIG. 4B is a diagram illustrating an example in which the electronic device 200 is an unmanned checkout counter in a restaurant, according to an embodiment of the disclosure. Referring to FIG. 4B, on May 10, 2019, the electronic device 200 may receive an utterance input by a user 10 who places an order for a salad. The electronic device 200 may output a response message notifying confirmation of the order for salad in response to the user's utterance input.

On May 15, 2019, the electronic device 200 may receive an utterance input by the user 10 who revisits the restaurant. The electronic device 200 may obtain a text stating "Order the one I've always eaten" via speech recognition on the user's utterance input. The electronic device 200 may identify temporal expressions in the obtained text, such as "always" and "eaten". The electronic device 200 may determine that a user's conversation history is needed to interpret the obtained text based on the identified temporal expressions.

According to an embodiment of the disclosure, the electronic device 200 may determine a noun that needs to be specified in the text as an entity that needs to be specified and specify an object indicated by the noun based on conversation history information. For example, as shown in FIG. 4B, the electronic device 200 may determine "the one" as an entity that needs to be specified in the user's utterance "Order the one I've always eaten". The electronic device 200 may determine that the food that the user 10 desires to order is "salad", based on the conversation history dated May 10. The electronic device 200 may output a response message requesting confirmation that the order for salad is correct, in response to the user's utterance input.

In addition, according to an embodiment of the disclosure, to perform a smooth conversation with the user 10, the electronic device 200 may need to shorten the time required to generate a response message based on a conversation history. Thus, according to an embodiment of the disclosure, the electronic device 200 may shorten the time required to retrieve the conversation history information by searching only a database selected from among a plurality of databases for storing information about a conversation history.

FIG. 5 is a diagram illustrating an example process, performed by the electronic device 200, of providing a conversational service, according to an embodiment of the disclosure.

FIG. 5 illustrates an example in which an electronic device 200 is an unmanned kiosk in a store that sells electronic products, according to an embodiment of the disclosure. According to an embodiment of the disclosure, the electronic device 200 may use a first database 501 for storing conversation history information accumulated before a current session for providing a conversational service starts and a second database 502 for storing information related to conversations performed during the current session.

Figure 6:
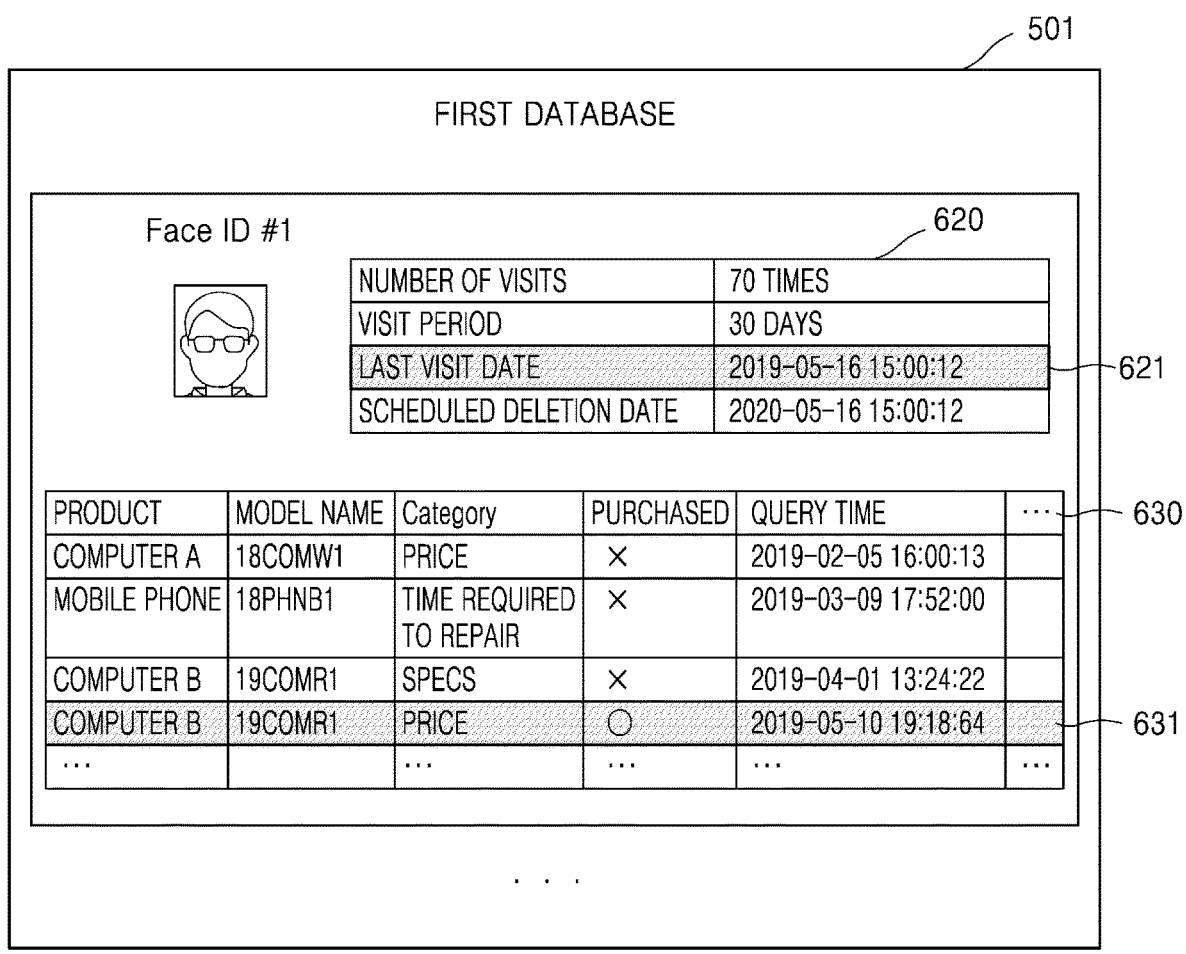
FIG. 6 is a diagram illustrating an example of stored conversation history information according to an embodiment of the disclosure.

FIG. 6 is a diagram illustrating an example of a service usage history and a conversation history for each user, which are stored in the first database 501, according to an embodiment of the disclosure. As illustrated in FIG. 6, the electronic device 200 may map a service usage history 620 and a conversation history 630 to a face ID of a user 10 for storage.

The service usage history 620 may include, for example, and without limitation, the number of visits made by the user 10, a visit period, a last visit date 621, and a date when the service usage history 620 is scheduled for deletion. The conversation history 630 may include information about a user's product of interest and a category of a user's past question, which are determined based on the user's past question, whether the user 10 purchased the product of interest, a time point when a user's question is received, etc.

The electronic device 200 may identify the user 10 by performing face recognition on a face image of the user 10 obtained via a camera (operation S510). For example, the electronic device 200 may retrieve a conversational service usage history corresponding to a face ID of the identified user 10 by searching the first database 501.

The electronic device 200 may update the conversational service usage history for the identified user 10 by adding information indicating that the user 10 is currently using a conversational service (operation S520).

For example, as shown in FIG. 6, the electronic device 200 may update the conversational service usage history 620 for the user 10 in such a manner as to add information 621 indicating that the user 10 used the conversational service on May 16, 2019.

According to an embodiment of the disclosure, the electronic device 200 may delay a date on which information related to the user 10 is scheduled for deletion, based on at least one of the number of visits by the user 10 or a visit period, which is recorded in the user's usage history. For example, as the number of visits by the user 10 increases and the visit periods become shorter, the electronic device 200 may extend a storage period for the information related to the user 10.

The electronic device 200 may initiate a conversational service and receive a user's utterance input (operation S530). The electronic device 200 may obtain a text stating "I'm having a problem with a product I bought last time" from the user's utterance input. The electronic device 200 may identify "last time" that is a temporal expression representing a time in the obtained text.

The electronic device 200 may determine, based on the temporal expression "last time" that information about a user's conversation history accumulated before a time point when the current session starts is needed to interpret the obtained text.

The electronic device 200 may retrieve information about a user's conversation history from the first database 501 based on a determination that the information about the user's conversation history accumulated before the start of the current session is needed (operation S540). The electronic device 200 may determine a "product" that is a noun included in the user's utterance "I'm having a problem with a product I bought last time" as an entity that needs to be specified, and interpret the text based on the information about the user's conversation history acquired from the first database 501.

For example, the electronic device 200 may determine, based on a conversation history 631 dated May 10, that the product that the user 10 intends to refer to is "computer B" having a model name of 19COMR1.

In response to the user's utterance input, the electronic device 200 may output a response message confirming whether the user 10 visited the store because of a problem with computer B bought on May 10 (operation S550).

After ending the conversational service, the electronic device 200 may update information about a user's conversation history in the first database 510 in such a manner as to add information about a history of conversations performed during the session (operation S560).

Figure 7A:
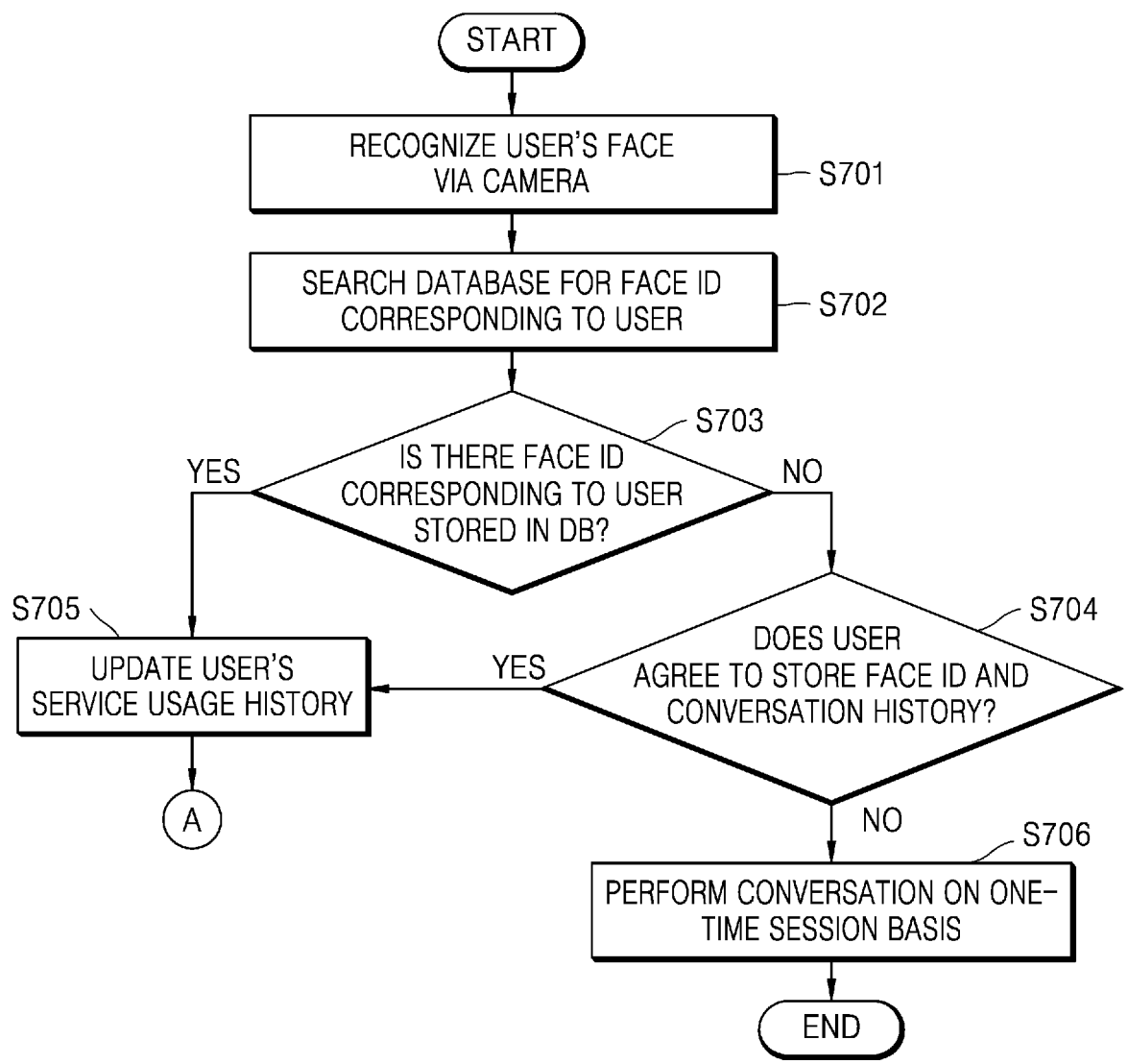
FIG. 7A is a flowchart illustrating an example method, performed by an electronic device, of providing a conversational service, according to an embodiment of the disclosure.
Figure 7B:
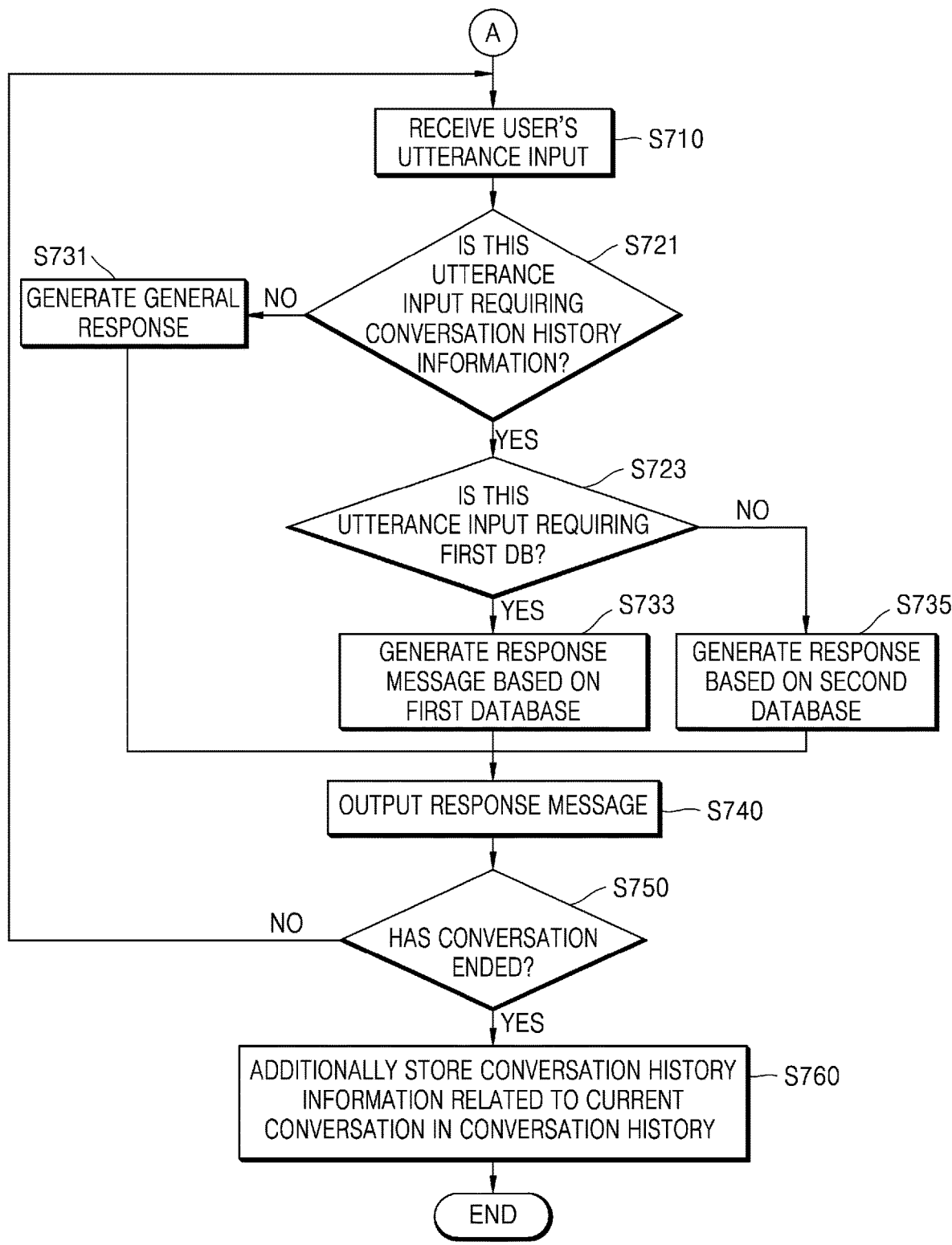
FIG. 7B is a flowchart illustrating an example method, performed by an electronic device, of providing a conversational service, according to an embodiment of the disclosure.

FIG. 7A is a flowchart illustrating an example method, performed by the electronic device 200, of providing a conversational service, according to an embodiment of the disclosure, and FIG. 7B is a flowchart illustrating an example method, performed by the electronic device 200, of providing a conversational service, according to an embodiment of the disclosure.

A user may start using a conversational service by approaching the electronic device 200.

According to an embodiment of the disclosure, the electronic device 200 may recognize a user's face via a camera (operation S701). According to an embodiment of the disclosure, the electronic device 200 may search a database for a stored face ID corresponding to the recognized user (operation S702). According to an embodiment of the disclosure, the electronic device 200 may determine whether the face ID corresponding to the recognized user is stored in the database (operation S703).

When the user's face ID is stored in the database ("Yes" in operation S703), the electronic device 200 may retrieve a user's service usage history. According to an embodiment of the disclosure, the electronic device 200 may update a user's service usage history (operation S705). For example, the electronic device 200 may update information related to a date of a user's last visit contained in the user's service usage history.

According to an embodiment of the disclosure, when the user's face ID is not stored in the database ("no" in operation S703), the electronic device 200 may ask the user whether he or she agrees to store the user's face ID and a conversation history in the future (operation S704). According to an embodiment of the disclosure, when the user agrees to store his or her face ID and conversation history ("Yes" in operation S704), the electronic device 200 may update the user's service usage history in operation S705. According to an embodiment of the disclosure, when the user does not agree to store his or her face ID and conversation history, the electronic device 200 may perform a conversation with the user on a one-time session basis.

Referring to FIG. 7B, according to an embodiment of the disclosure, the electronic device 200 may receive a user's utterance input (operation S710).

According to an embodiment of the disclosure, the electronic device 200 may determine whether conversation history information is needed to interpret the user's utterance input (operation S721). Operation S721 will be described in greater detail below with reference to FIG. 8.

When it is determined that the conversation history information is not needed for the interpretation ("No" in operation S721), according to an embodiment of the disclosure, the electronic device 200 may generate and output a general response without using the conversation history information (operation S731).

When it is determined that the conversation history information is needed for the interpretation ("Yes" in operation S721), according to an embodiment of the disclosure, the electronic device 200 may determine whether conversation history information included in a first database is needed (operation S723).

For example, according to an embodiment of the disclosure, the electronic device 200 may determine, based on a preset time point, whether conversation history information of the user accumulated before the preset time point and stored in the first database is needed or conversation history information of the user accumulated after the preset time point and stored in a second database is needed. The first database may store conversation history information accumulated over a relatively long period of time from when a user's conversation history is first stored to the preset time point. The second database may store conversation history information accumulated over a short period of time from the preset time point to the current time point. Operation S723 will be described in greater detail below with reference to FIG. 9.

When it is determined that the conversation history information included in the first database is needed to interpret the user's utterance input ("Yes" in operation S723), according to an embodiment of the disclosure, the electronic device 200 may generate a response message based on the conversation history information acquired from the first database (operation S733). When it is determined that the conversation history information included in the first database is not needed to interpret the user's utterance input ("No" in operation S723), according to an embodiment of the disclosure, the electronic device 200 may generate a response message based on the conversation history information acquired from the second database (operation S735).

According to an embodiment of the disclosure, the electronic device 200 may output the generated response message (operation S740).

According to an embodiment of the disclosure, the electronic device 200 may determine whether a conversation has ended (operation S750). For example, the electronic device 200 may determine that the conversation has ended when the user moves away from the electronic device 200 by a distance greater than or equal to a threshold distance, when the user's utterance input is not received for more than a threshold time, or when it is determined that the user deviates from any space (e.g., a store or restaurant) where the electronic device 200 is located.

When it is determined that the conversation has ended ("Yes" in operation S750), according to an embodiment of the disclosure, the electronic device 200 may additionally store conversation history information related to the current conversation in a stored conversation history mapped to a user's face ID (operation S760). Otherwise, when it is determined that the conversation has not ended ("No" in operation S750), according to an embodiment of the disclosure, the electronic device 200 may return to operation S710 and repeat a process of receiving a user's utterance input and generating a response message to the user's utterance input.

Figure 8:
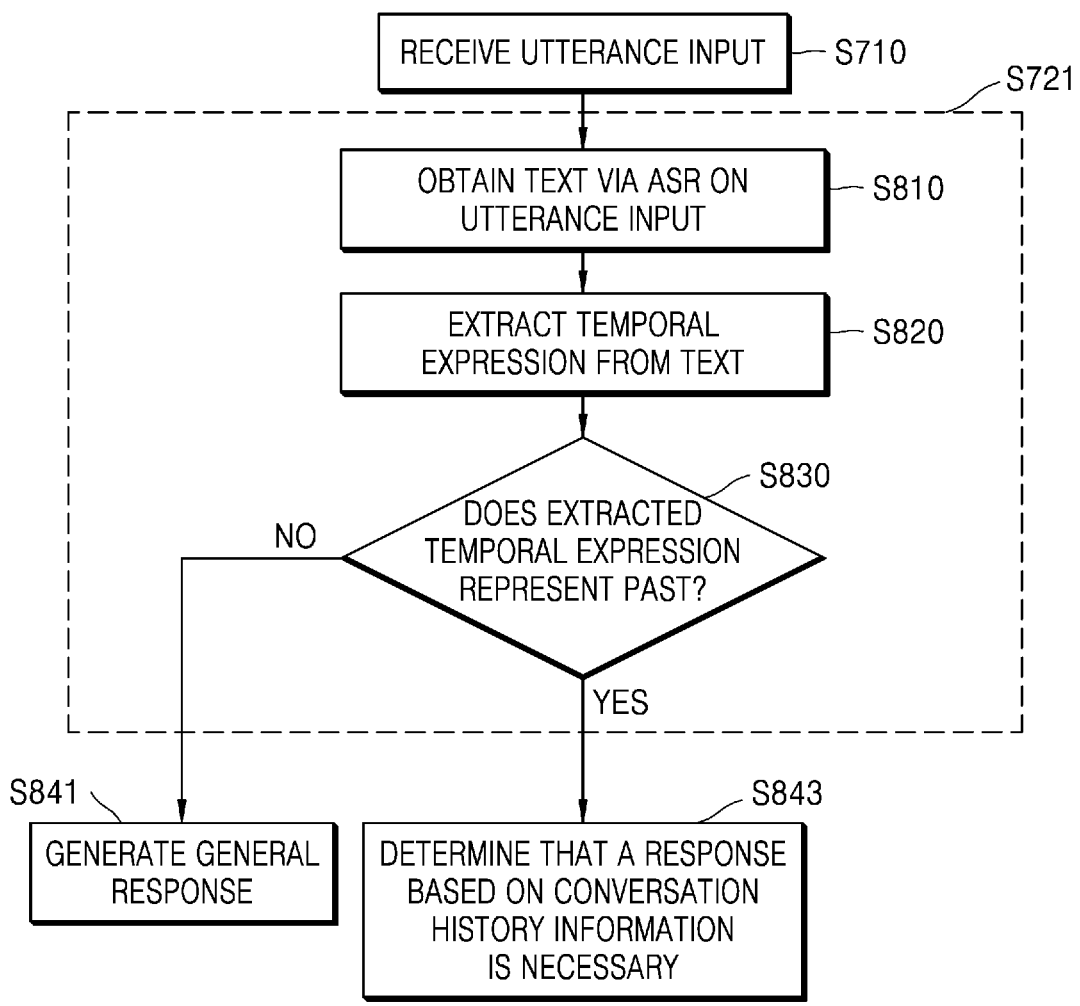
FIG. 8 is a flowchart illustrating an example method of determining whether an electronic device will generate a response using conversation history information, according to an embodiment of the disclosure.

FIG. 8 is a flowchart illustrating an example method of determining whether the electronic device 200 will generate a response based on conversation history information, according to an embodiment of the disclosure.

Operation S721 of FIG. 7B may, for example, be subdivided into operations S810, S820, and S830 of FIG. 8.

According to an embodiment of the disclosure, the electronic device 200 may receive a user's utterance input (operation S710). According to an embodiment of the disclosure, the electronic device 200 may obtain a text by performing speech recognition (e.g., automatic speech recognition (ASR)) on the received user's utterance input (operation S810).

According to an embodiment of the disclosure, the electronic device 200 may extract a temporal expression from the obtained text (operation S820). According to an embodiment of the disclosure, the electronic device 200 may extract a temporal expression by applying a pre-trained temporal expression extraction model to the obtained text.

According to an embodiment of the disclosure, the electronic device 200 may determine whether the extracted temporal expression represents a time point, a period, or duration in the past (operation S830). When the extracted temporal expression is not a temporal expression representing the past ("No" in operation S830), the electronic device 200 may generate a response to the user's utterance input based on general NLU that does not take a conversation history into account (operation S841). Otherwise, when the extracted temporal expression is a temporal expression representing the past ("Yes" in operation S830), the electronic device 200 may determine that it is necessary to generate a response based on conversation history information (operation S843).

Figure 9:
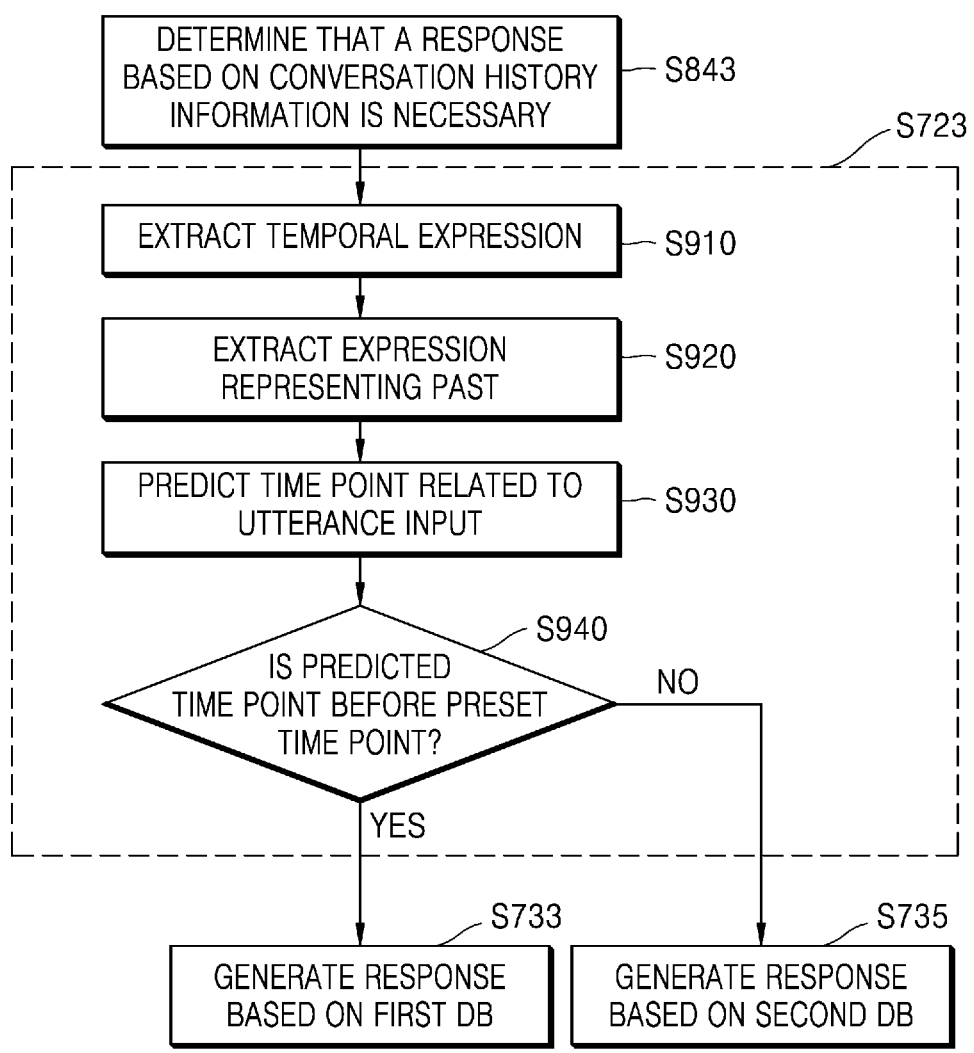
FIG. 9 is a flowchart illustrating an example method, performed by an electronic device, of selecting a database based on a user's utterance input, according to an embodiment of the disclosure.

FIG. 9 is a flowchart illustrating an example method, performed by the electronic device 200, of selecting a database based on a user's utterance input, according to an embodiment of the disclosure.

Operation S723 of FIG. 7B may, for example, be subdivided into operations S910, S920, S930 and S940 of FIG. 9.

According to an embodiment of the disclosure, in operation S843, the electronic device 200 may determine that conversation history information is needed to interpret a users utterance input.

According to an embodiment of the disclosure, the electronic device 200 may extract temporal expressions from a text obtained based on the user's utterance input (operation S910). According to an embodiment of the disclosure, the electronic device 200 may extract an expression representing the past from among the extracted temporal expressions (operation S920). Because operation S910 of FIG. 9 corresponds to operation S820 of FIG. 8, operation S910 may not be performed according to an embodiment of the disclosure. When operation S910 of FIG. 9 is not performed, the electronic device 200 may use the temporal expression extracted and stored in operation S820.

According to an embodiment of the disclosure, the electronic device 200 may predict a time point related to the user's utterance input based on the temporal expression representing the past (operation S930). According to an embodiment of the disclosure, the electronic device 200 may determine a time point related to the extracted past time expression by applying a pre-trained time point prediction model to the extracted past time expression.

Figure 10:
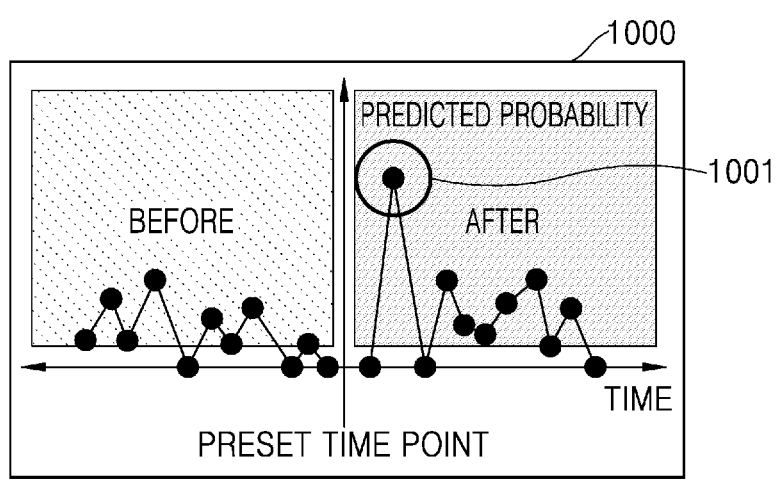
FIG. 10 is an example probability graph used by an electronic device to determine a time point related to a user's utterance input, according to an embodiment of the disclosure.

As seen on FIG. 10, the electronic device 200 may predict probability values, e.g., probabilities that the temporal expression representing the past indicates each of a plurality of time points and generate a graph 1000 representing the predicted probability values. The electronic device 200 may determine a time point corresponding to a highest probability value 1001 from among the predicted probability values as being the time point related to the user's utterance input. In the graph 1000, x- and y-axes may respectively denote the time and a probability value. The zero point on the time-axis in the graph 1000 represents a preset time point serving as a reference point for selecting a database.

According to an embodiment of the disclosure, the electronic device 200 may determine whether the predicted time point is before a preset time point (operation S940).

When the predicted time point is before the preset time point ("Yes" in operation S940), the electronic device 200 may generate a response to the user's utterance input based on conversation history information acquired from a first database (operation S733). When the predicted time point is at or after the preset time point ("No" in operation S940), the electronic device 200 may generate a response to the user's utterance input based on conversation history information acquired from a second database (operation S735).

According to an embodiment of the disclosure, the electronic device 200 may manage a plurality of databases according to a period over which a conversation history is accumulated, thereby reducing the time required to retrieve the conversation history. According to an embodiment of the disclosure, the electronic device 200 may switch between databases such that at least some of information about a user's conversation history stored in one database is stored in another database.

In the disclosure, while FIG. 10 illustrates an example in which the electronic device 200 uses two databases, embodiments of the disclosure are not limited thereto. The databases used by the electronic device 200 may include three or more databases. For convenience of description, in the disclosure, a case in which the databases include the first and second databases is described as an example.

Figure 11:
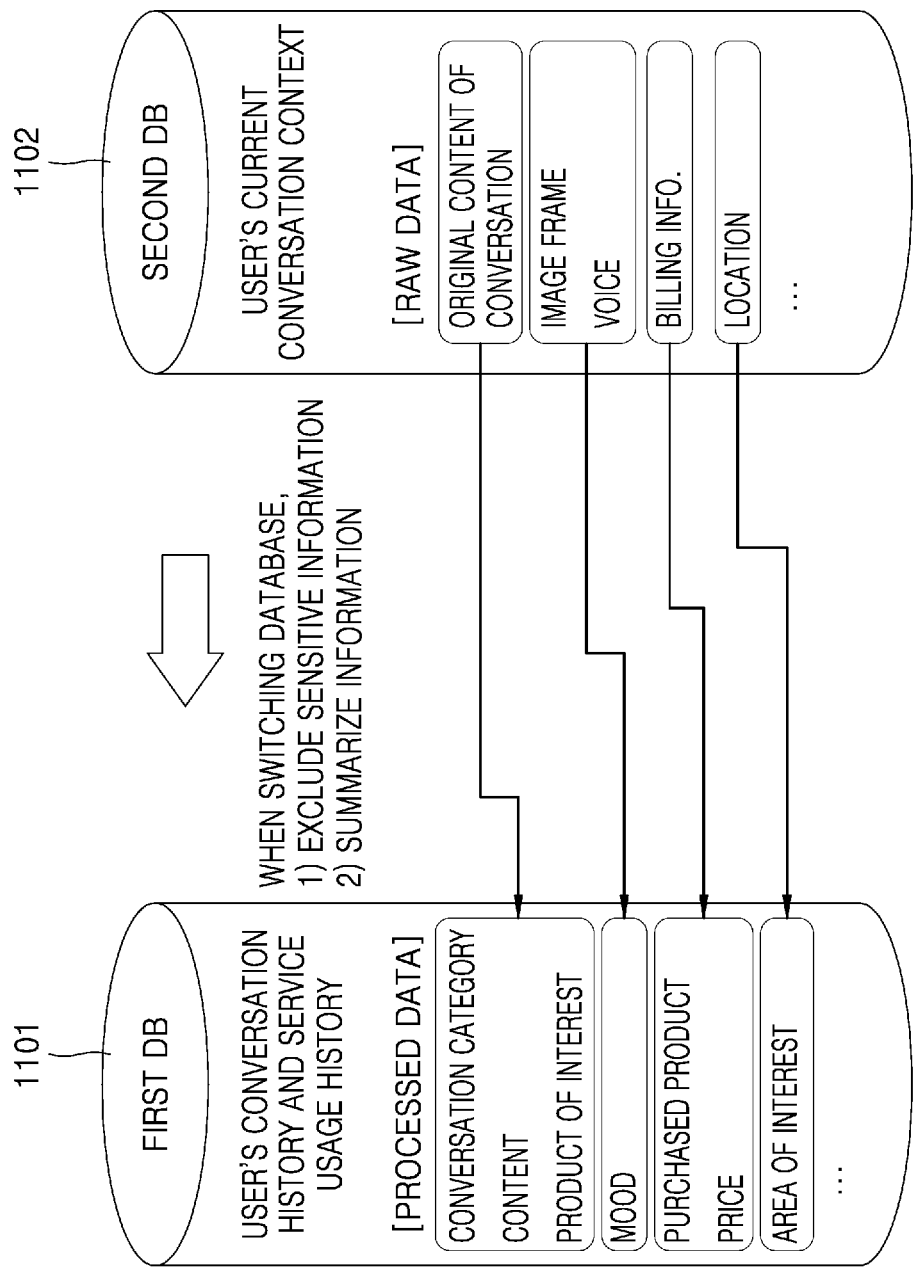
FIG. 11 is a diagram illustrating an example method, performed by an electronic device, of switching a database in which a user's conversation history is stored, according to an embodiment of the disclosure.

FIG. 11 is a diagram illustrating an example method, performed by the electronic device 200, of switching a database in which a user's conversation history is stored, according to an embodiment of the disclosure.

According to an embodiment of the disclosure, a first database 1101 may store information about a user's conversation history accumulated before a preset time point, and a second database may store information about a user's conversation history accumulated after the preset time point. For example, the preset time point may be one of a time point when at least some of the information about the user's conversation history included in the second database 1102 is transmitted to the first database 1101, a time point when a user's face image is obtained, a time point when a conversational service starts, and a time point that occurs a predetermined time before the current time point, but the disclosure is not limited thereto.

According to an embodiment of the disclosure, the first database 1101 may store conversation history information accumulated over a relatively long period of time from when a user's conversation history is first stored to the preset time point. The second database 1102 may store conversation history information accumulated over a short period of time from the preset time point to the current time point.

For example, the first database 1101 may be included in an external server while the second database 1102 may be included in the electronic device 200. The first database 1101 may further store a user's service usage history.

According to an embodiment of the disclosure, the electronic device 200 may switch at least some of information about a user's conversation history stored in the second database 1102 to the first database 1101.

According to an embodiment of the disclosure, the electronic device 200 may switch a database in which conversation history information of the user is stored periodically or after starting or ending a specific operation or when a storage space for the database is insufficient.

For example, the electronic device 200 may transmit to the first database 1101 information about a user's conversation history stored in the second database 1102 according to a predetermined period such as, for example, and without limitation, 6 hours, one day, one month, etc., and delete the information about the user's conversation history from the second database 1102.

As another example, when the conversational service ends, the electronic device 200 may transmit to the first database 1101 information about a user's conversation history accumulated in the second database 1102 while the conversational service is provided, and delete the information about the user's conversation history from the second database 1102.

According to an embodiment of the disclosure, the electronic device 200 may summarize information excluding sensitive information of the user when switching between databases, thereby mitigating the risk of leakage of user's personal information and reducing the memory usage.

Raw data that is unprocessed data may be stored in the second database 1102. The second database 1102 may store original data as it is input to the electronic device 200 as conversation history information of the user.

For example, the user may be reluctant to store for a long time detailed information related to the user's personal information (e.g., specific conversation content, captured images of the user, a user's voice, user's billing information, a user's location, etc.) in the electronic device 200. Thus, according to an embodiment of the disclosure, the electronic device 200 may manage the conversation history information including information sensitive to the user such that the conversation history information is stored in the second database 1102 that stores the conversation history information only for a short period of time.

Processed data may be stored in the first database 1101. The first database 1101 may store, as the conversation history information of the user, data summarized by excluding the information sensitive to the user from the raw data stored in the second database 1102.

As shown in FIG. 11, an original content of a conversation between the user and the electronic device 200, which is stored in the second database 1102, may be summarized into data regarding a conversation category, content, and a product of interest and be stored in the first database 1101. An image frame captured of the user and a user's voice, which are stored in the second database 1102, may be summarized as the user's mood at a time point when the conversational service is provided and stored in the first database 1101. In addition, payment information of the user stored in the second database 1102 may be summarized as a product purchased by the user and a purchase price and stored in the first database 1101.

Figure 12A:
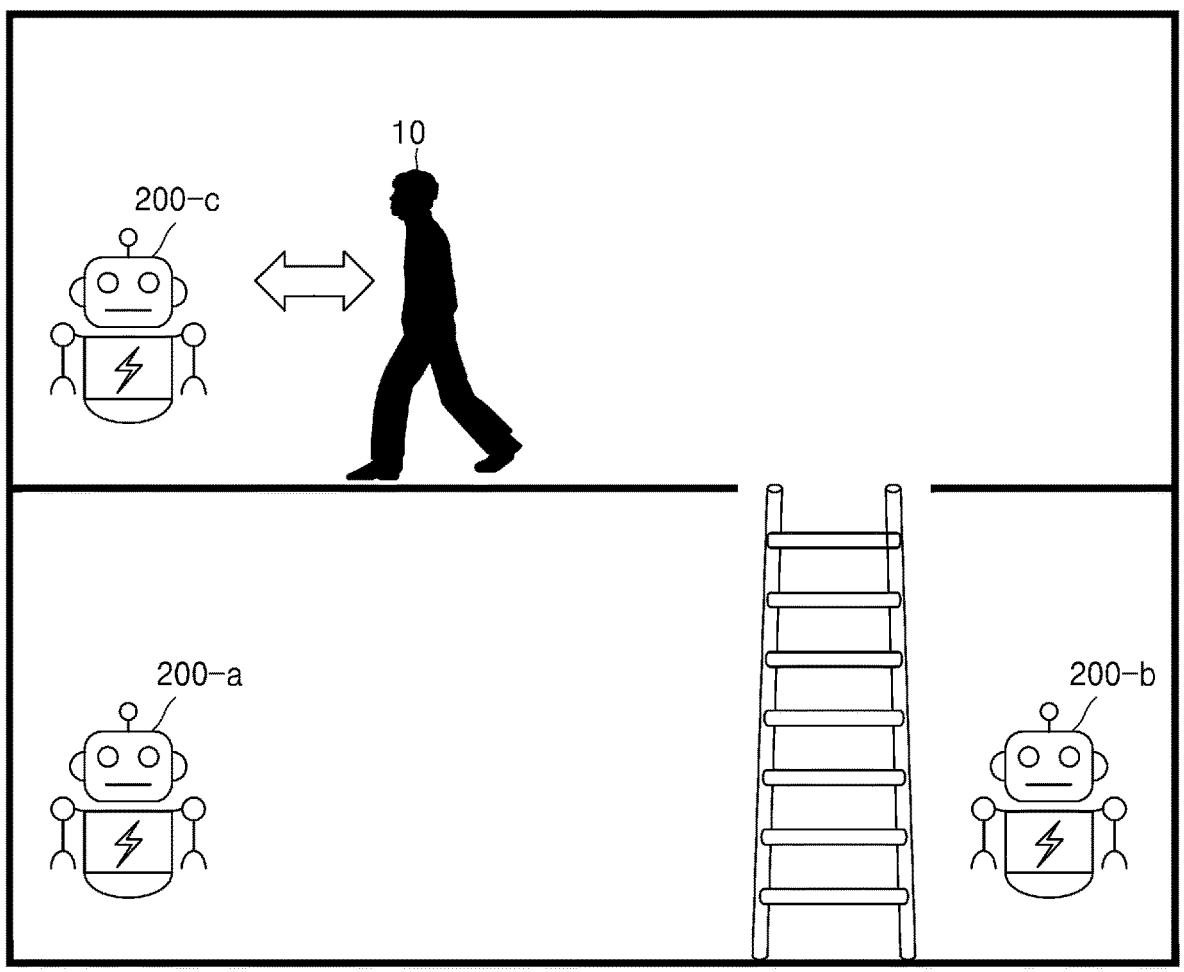
FIG. 12A is a diagram illustrating an example process in which a plurality of electronic devices share a user's conversation history with one another, according to an embodiment of the disclosure.

According to an embodiment of the disclosure, the electronic device 200 may share at least one of a user's face ID, a service usage history, or a conversation history with other electronic devices. FIG. 12A is a diagram illustrating an example process in which a plurality of electronic devices 200-*a*, 200-*b*, and 200-*c* share a user's conversation history with one another, according to an embodiment of the disclosure. For example, the electronic devices 200-*a*, 200-*b*, and 200-*c* may be unmanned kiosks located in different spaces (e.g., on different floors) of a store. A user 10 may receive guidance as to a product or help in purchasing the product based on conversational services provided by the electronic devices 200-*a*, 200-*b*, and 200-*c*.

Referring to FIG. 12A, the electronic device 200-*c* may provide a conversational service to the user 10. The electronic device 200-*c* may receive an utterance input by the user 10 and generate and output a response message to the utterance input.

Figure 12B:
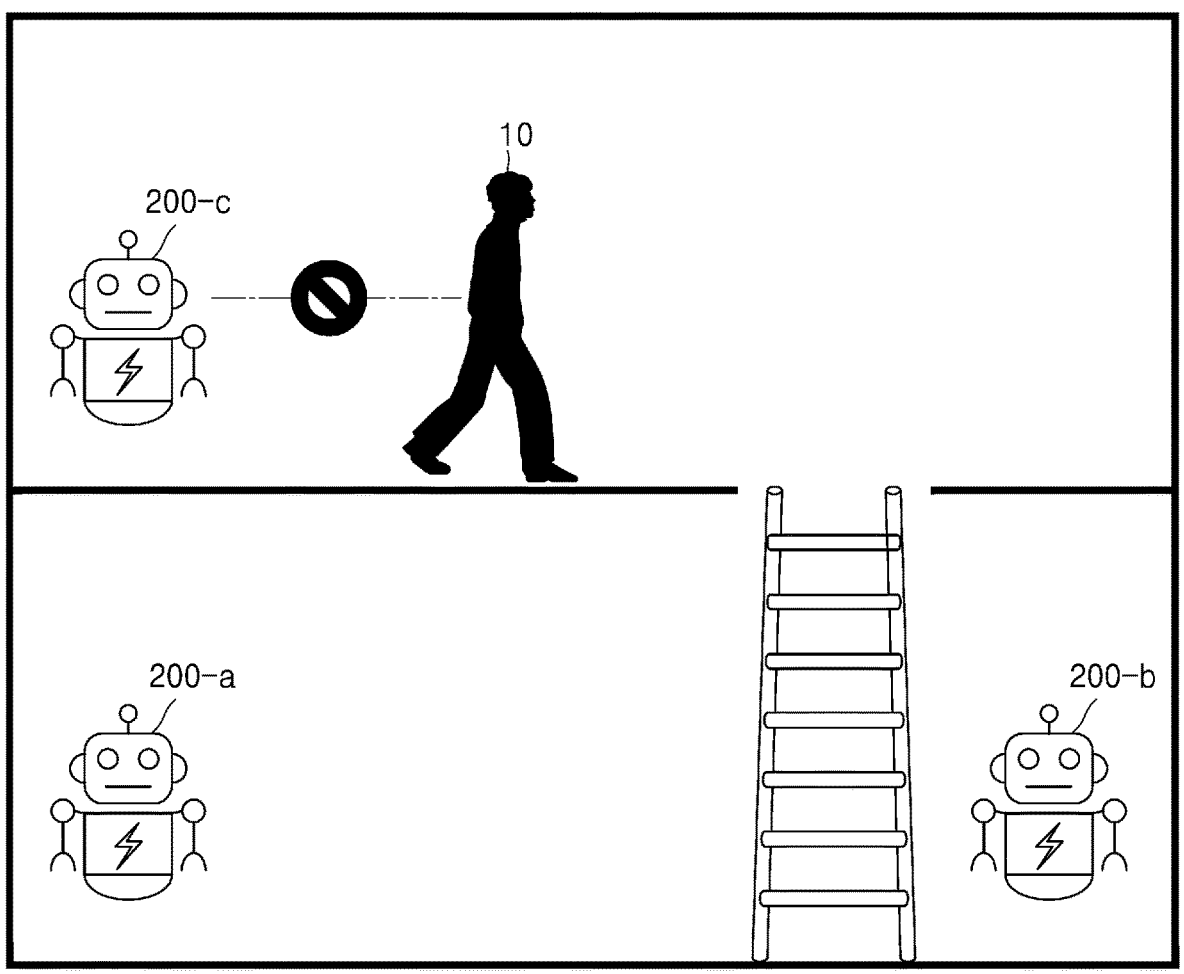
FIG. 12B is a diagram illustrating an example process in which a plurality of electronic devices share a user's conversation history with one another, according to an embodiment of the disclosure.

FIG. 12B is a diagram illustrating an example process in which a plurality of electronic devices 200-*a*, 200-*b*, and 200-*c* share a user's conversation history with one another, according to an embodiment of the disclosure.

Referring to FIG. 12B, the user 10 may move away from the electronic device 200-*c* by a distance greater than or equal to a predetermined distance after completing consultation with the electronic device 200-*c*. The electronic device 200-*c* may recognize that a conversation is suspended based on a distance away from the user 10. The electronic device 200-*c* may store, in a database, information about a history of conversations with the user 10 performed during the current session. For example, the electronic device 200-*c* may store information about a history of conversations with the user 10 performed during the current session in a second database included in the electronic device 200-*c*.

Figure 12C:
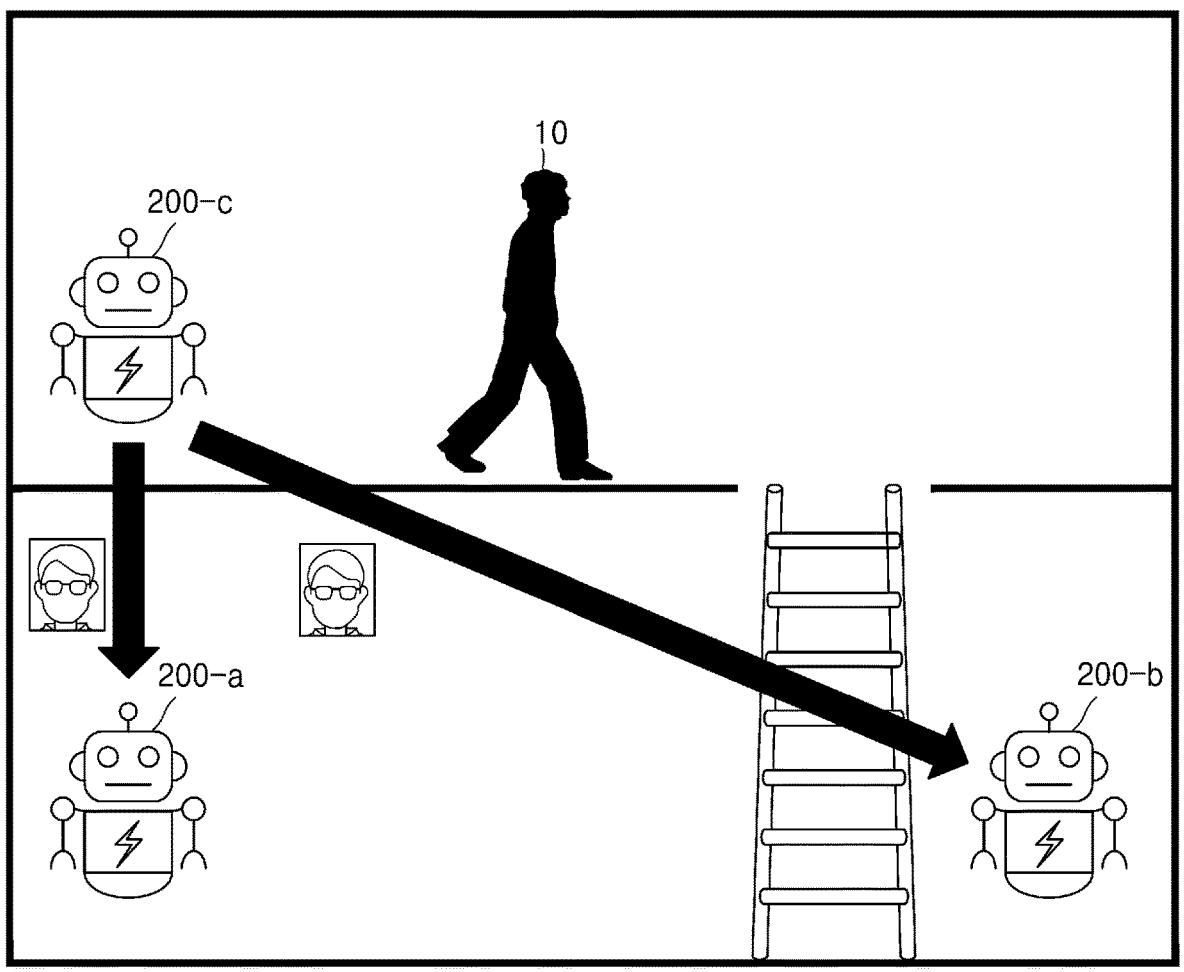
FIG. 12C is a diagram illustrating an example process in which a plurality of electronic devices share a user's conversation history with one another, according to an embodiment of the disclosure.

FIG. 12C is a diagram illustrating an example process in which a plurality of electronic devices 200-*a*, 200-*b*, and 200-*c* share a user's conversation history with one another, according to an embodiment of the disclosure.

Referring to FIG. 12C, the electronic device 200-*c* may, for example, and without limitation, share or broadcast a face ID of the user 10, who has completed consultation with it, to the other electronic devices 200-*a* and 200-*b* in a store.

Figure 12D:
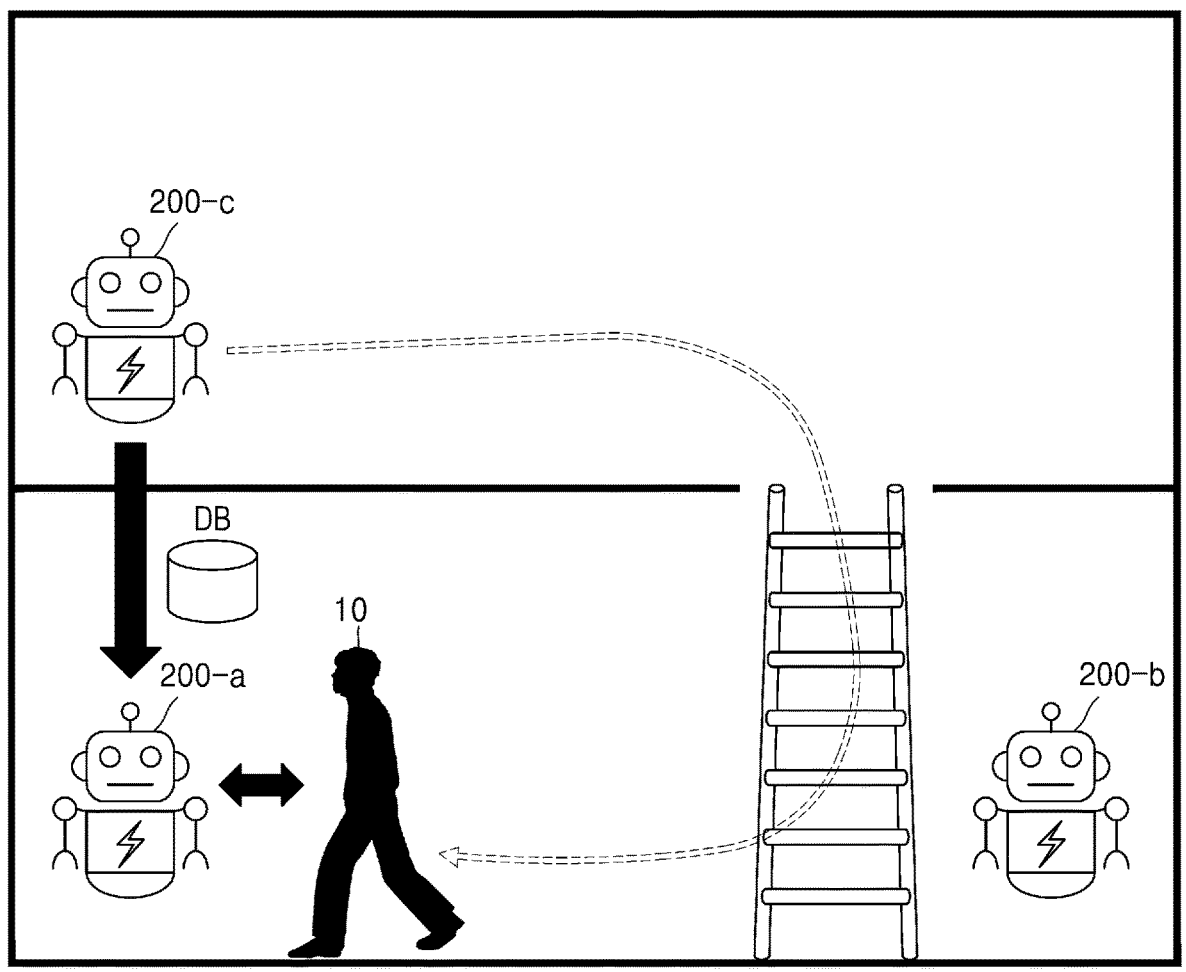
FIG. 12D is a diagram illustrating an example process in which a plurality of electronic devices share a user's conversation history with one another, according to an embodiment of the disclosure.

FIG. 12D is a diagram illustrating an example process in which a plurality of electronic devices 200-*a*, 200-*b*, and 200-*c* share a user's conversation history with one another, according to an embodiment of the disclosure.

Referring to FIG. 12D, after looking around a second floor of the store, the user 10 may go down to the first floor and approach the electronic device 200-*a*. The electronic device 200-*a* may identify the user 10 to provide a conversational service to the user 10. When it is determined that the identified user 10 corresponds to the face ID shared by the electronic device 200-*c*, the electronic device 200-*a* may request the electronic device 200-*c* to share a database in which information related to the shared face ID is stored.

The electronic device 200-*c* may share with the electronic device 200-*a* a database in which a conversational history corresponding to the face ID of the user 10 is stored. The electronic device 200-*a* may interpret the user's utterance input based on the conversation history stored in the shared database. Thus, even when the electronic device 200-*a* receives an utterance input related to a conversation with the electronic device 200-*c* from the user 10, the electronic device 200-*a* may output a response message that guarantees continuity of the conversation.

A configuration of the electronic device 200 according to an embodiment of the disclosure will now be described in greater detail. Each component of the electronic device 200 to be described below may perform each operation of the method, performed by the electronic device 200, of providing a conversational service as described above.

Figure 13A:
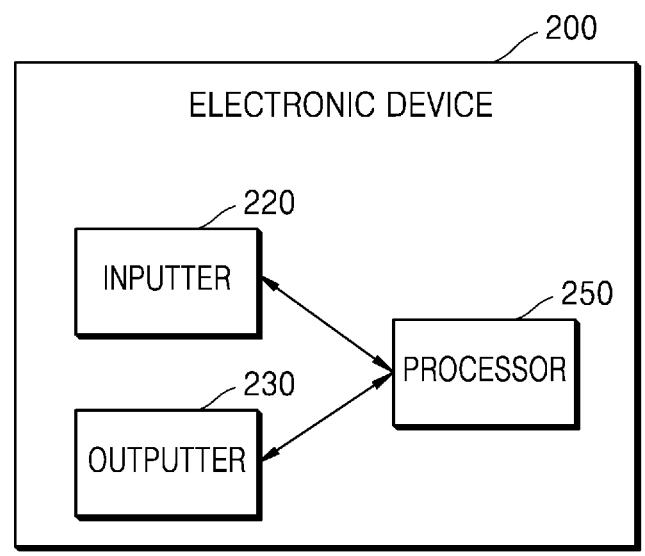
FIG. 13A is a block diagram illustrating an example configuration of an example electronic device according to an embodiment of the disclosure.

FIG. 13A is a block diagram illustrating an example configuration of an example electronic device 200 according to an embodiment of the disclosure.

The electronic device 200 for providing a conversational service may include a processor (e.g., including processing circuitry) 250 that provides the conversational service to a user by executing one or more instructions stored in a memory. Although FIG. 13A shows that the electronic device 200 includes one processor 250, embodiments of the disclosure are not limited thereto. The electronic device 200 may include a plurality of processors. When the electronic device 200 includes a plurality of processors, operations and functions of the processor 250 to be described below may be partially performed by the processors.

An inputter 220 of the electronic device 200 may include various input circuitry and receive a user's utterance input.

According to an embodiment of the disclosure, the processor 250 may identify a temporal expression representing a time in a text obtained from the user's utterance input.

The processor 250 may obtain a text via speech recognition on the user's utterance input and perform embedding for mapping the text to a plurality of vectors. For example, by applying a bidirectional LSTM model to the mapped vectors, the processor 250 may assign a BIO tag to at least one morpheme representing at least one of a time point, duration, or a period included in the text. The processor 250 may determine, based on a BIO tag, an entity representing at least one of a time point, duration, or a period included in the text as a temporal expression.

According to an embodiment of the disclosure, the processor 250 may determine a time point related to the user's utterance input based on the temporal expression.

The processor 250 may predict probability values, e.g., the probabilities that the identified temporal expression indicates each of a plurality of time points and determine a time point corresponding to a highest probability value from among the predicted probability values as being the time point related to the user's utterance input.

According to an embodiment of the disclosure, the processor 250 may select a database corresponding to the time point related to the user's utterance input from among a plurality of databases for storing information about a conversation history for the user who uses the conversational service.

The plurality of databases may include a first database for storing information about a user's conversation history accumulated before a preset time point and a second database for storing information about a user's conversation history accumulated after the preset time point. The processor 250 may select the first database from among the databases when the time point related to the user's utterance input is before the preset time point. The processor 250 may select the second database from among the databases when the time point related to the user's utterance input is after the preset time point.

In addition, the first database may be stored in an external server while the second database may be stored in the electronic device 200. The preset time point t serving as a reference point for selecting a database may be one of time points when at least some of information about a user's conversation history included in the second database is switched to be included in the first database, when a user's face image is obtained, and when a conversational service starts.

According to an embodiment of the disclosure, the processor 250 may interpret the text based on information about a user's conversation history acquired from the selected database.

The processor 250 may determine an entity that is included in the text and needs to be specified. The processor 250 may acquire specification information for specifying the determined entity by retrieving the information about the user's conversation history acquired from the selected database. The processor 250 may interpret the text and the specification information using an NLU model. The processor 250 may determine a type of a response message by applying a DM model to an interpretation result and generate a response message of the determined type using an NLG model.

The processor 250 may generate a response message to the received user's utterance input based on the interpretation result. An outputter 230 of the electronic device 200 may include various output circuitry and output the generated response message.

Configurations of the electronic device 200 according to various embodiments of the disclosure are not limited to that shown in the block diagram of FIG. 13A. For example, FIG. 13B is a block diagram illustrating an example configuration of an example electronic device 200 according to another embodiment of the disclosure.

Figure 13B:
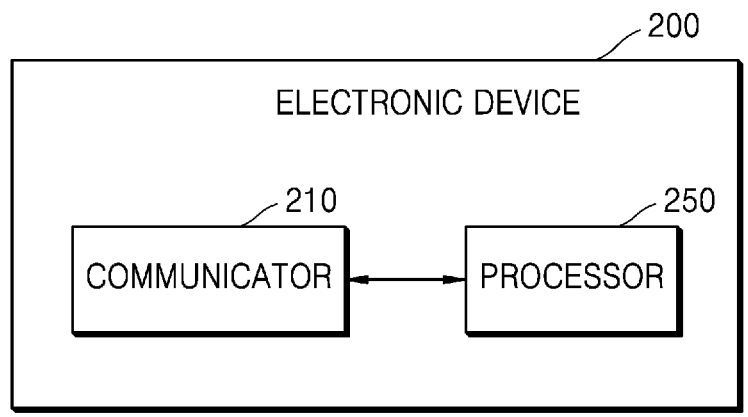
FIG. 13B is a block diagram illustrating an example configuration of an example electronic device according to another embodiment of the disclosure.

Referring to FIG. 13B, the electronic device 200 according to another embodiment of the disclosure may include a communicator 210 that may include various communication circuitry and receives a user's utterance input via an external device and transmits a response message to the user's utterance input to the external device. The processor 250 may select a database based on a time point related to the user's utterance input and generate a response message based on a user's conversation history stored in the selected database. Descriptions that are already provided above with respect to FIG. 13A are omitted.

Figure 14:
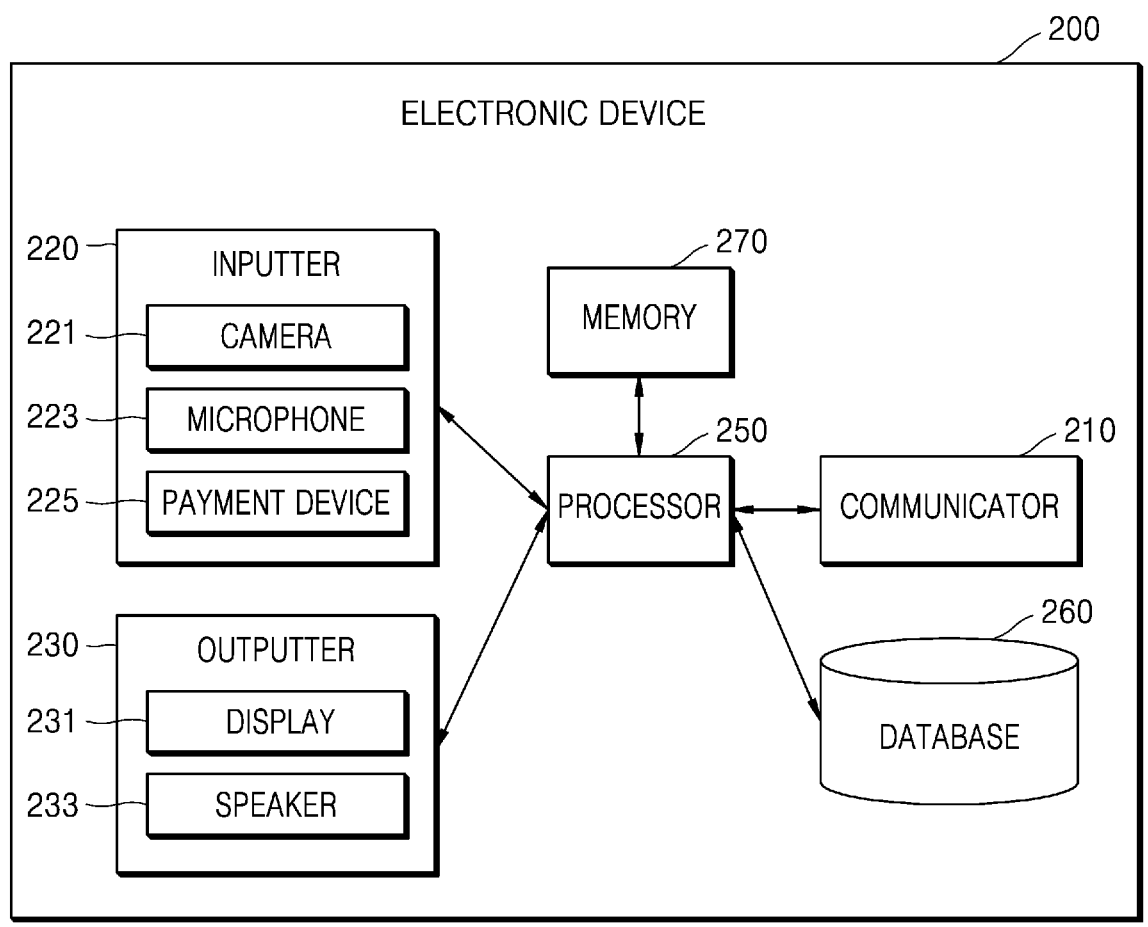
FIG. 14 is a block diagram illustrating an example electronic device according to an embodiment of the disclosure.

FIG. 14 is a block diagram illustrating an example electronic device 200 according to an embodiment of the disclosure.

As shown in FIG. 14, an inputter 220 of the electronic device 200 may include various input circuitry and receive a user input for controlling the electronic device 200. According to an embodiment of the disclosure, the inputter 220 may include a user input device including a touch panel for receiving a user's touch, a button for receiving a push operation by a user, a wheel for receiving a rotation operation by the user, a keyboard, a dome switch, etc., but is not limited thereto. For example, the inputter 220 may include, for example, and without limitation, at least one of a camera 221 used to recognize a user's face, a microphone 223 for receiving a user's utterance input, or a payment device 225 for receiving payment information of the user.

According to an embodiment of the disclosure, an outputter 230 of the electronic device 200 may include various output circuitry and output information, which is received from the outside, processed by the processor 250, or stored in a memory 270 or at least one database 260, in the form of, for example, and without limitation, at least one of light, a sound, an image, or a vibration. For example, the outputter 230 may include at least one of a display 231 or a speaker 233 for outputting a response message to a user's utterance input.

According to an embodiment of the disclosure, the electronic device 200 may further include the at least one database 260 for storing a user's conversation history. According to an embodiment of the disclosure, the database 260 included in the electronic device 200 may store conversation history information of the user accumulated before a preset time point.

According to an embodiment of the disclosure, the electronic device 200 may further include the memory 270. The memory 270 may include at least one of data used by the processor 250, a result processed by the processor 250, commands executed by the processor 250, or an artificial intelligence (AI) model used by the processor 250.

The memory 270 may include at least one type of storage medium, for example, a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EEPROM), PROM, a magnetic memory, a magnetic disc, or an optical disc.

While FIG. 14 shows that the database 260 and the memory 270 are separate components, embodiments of the disclosure are not limited thereto. For example, the database 260 may be included in the memory 270.

According to an embodiment of the disclosure, the communicator 210 may include various communication circuitry and communicate with an external electronic device or server using a wireless or wired communication method. For example, the communicator 210 may include a short-range wireless communication module, wired communication module, a mobile communication module, and a broadcast receiving module.

According to an embodiment of the disclosure, the electronic device 200 may share, via the communicator 210, at least one of, for example, and without limitation, a user's face ID, a service usage history, or a conversation history with another electronic device. For example, the electronic device 200 may transmit the user's face ID to another electronic device after the conversational service provided to the user ends. When the user desires to receive a conversational service via another electronic device, the other electronic device may identify the user and request information about a user's conversation history from the electronic device 200 based on a determination that the identified user corresponds to the received user's face ID. In response to the request received from the other electronic device, the electronic device 200 may transmit to the other electronic device information about a user's conversation history stored in the database 260.

Figure 15A:
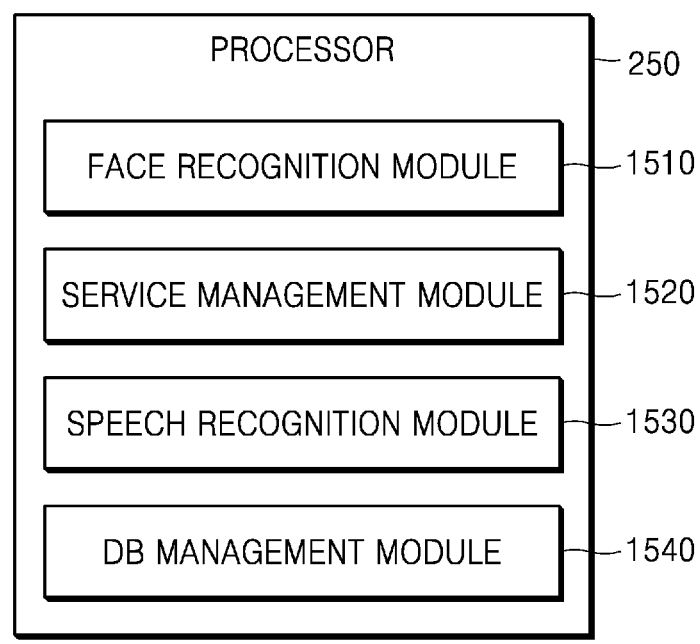
FIG. 15A is a block diagram illustrating an example processor included in an example electronic device, according to an embodiment of the disclosure.
Figure 15B:
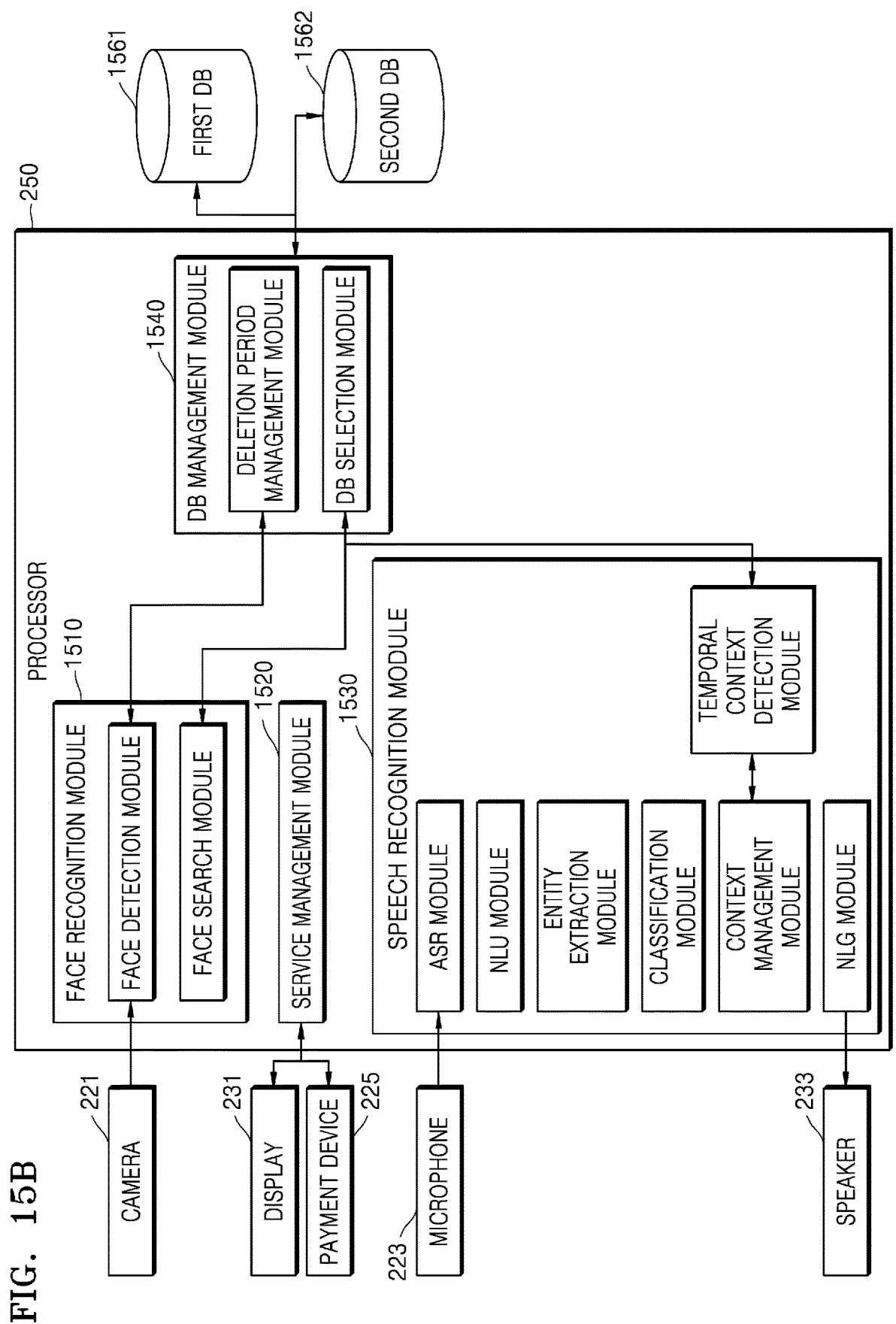
FIG. 15B is a block diagram illustrating an example processor included in an example electronic device, according to an embodiment of the disclosure.

FIG. 15A is a block diagram illustrating an example processor 250 included in the electronic device 200, according to an embodiment of the disclosure, and FIG. 15B is a block diagram illustrating another example processor 250 according to an embodiment of the disclosure.

According to an embodiment of the disclosure, operations and functions performed by the processor 250 included in the electronic device 200 may be represented by various modules shown in FIG. 15A. Some or all of the modules may be implemented using various numbers of hardware and/or software components that perform particular functions.

The face recognition module 1510 may include various processing circuitry and/or executable program elements and is a module for recognizing a face in an image captured via the camera (221 of FIG. 14).

The service management module 1520 may include various processing circuitry and/or executable program elements and is a module for managing a user's usage history for the electronic device 200 and may manage an activity history such as purchasing a product and/or searching for product information via the electronic device 200.

The speech recognition module 1530 may include various processing circuitry and/or executable program elements and obtain a text from a users utterance input and generate a response message to the user's utterance input based on a result of interpreting the text.

The database management module 1540 may include various processing circuitry and/or executable program elements and select at least one database for acquiring conversation history information from among a plurality of databases and manage a period during which information stored in the database is deleted.

Referring to FIG. 15B, the face recognition module 1510 of FIG. 15A may include a face detection module including various processing circuitry and/or executable program elements for detecting a face in an image and a face search module including various processing circuitry and/or executable program elements for searching a database for the detected face.

Furthermore, referring to FIG. 15B, the speech recognition module 1530 of FIG. 15A may include at least one of an auto speech recognition (ASR) module including various processing circuitry and/or executable program elements for converting a speech signal into a text signal, an NLU module including various processing circuitry and/or executable program elements for interpreting the meaning of a text, an entity extraction module including various processing circuitry and/or executable program elements for extracting an entity included in the text, a classification module including various processing circuitry and/or executable program elements for classifying the text according to a category of the text, a context management module including various processing circuitry and/or executable program elements for managing a conversation history, a temporal context detection module including various processing circuitry and/or executable program elements for detecting a temporal expression in a user's utterance input, or an NLG module including various processing circuitry and/or executable program elements for generating a response message corresponding to a result of interpreting the text and the temporal expression.

Furthermore, referring to FIG. 15B, the database management module 1540 of FIG. 15A may include a deletion period management module including various processing circuitry and/or executable program elements for managing a period during which information stored in a first database 1561 or a second database 1562 is deleted and a database selection module including various processing circuitry and/or executable program elements for selecting at least one database for acquiring and storing information from among the first and second databases 1561 and 1562.

Figure 16:
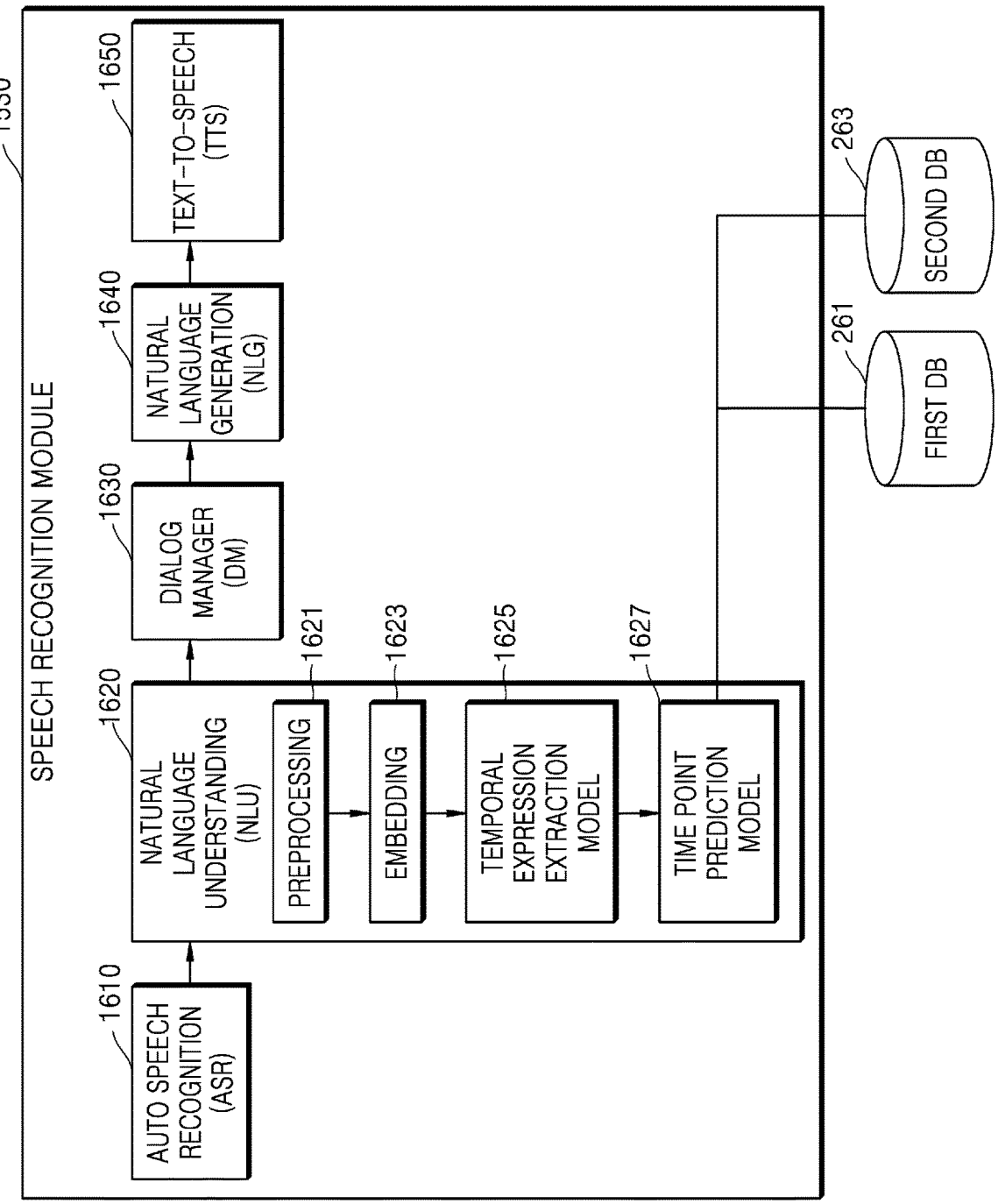
FIG. 16 is a block diagram illustrating an example speech recognition module according to an embodiment of the disclosure.

FIG. 16 is a block diagram illustrating an example configuration of the speech recognition module 1530 according to an embodiment of the disclosure.

Referring to FIG. 16, according to an embodiment of the disclosure, the speech recognition module 1530 included in the processor 250 of the electronic device 200 may include an ASR module 1610, an NLU module 1620, a DM module 1630, an NLG module 1640, and a text-to-speech (TTS) module 1650 each of which may include various processing circuitry and/or executable program elements.

The ASR module 1610 may convert a speech signal into a text. The NLU module 1620 may interpret the meaning of the text. The DM module 1630 may lead a conversation by managing contextual information, including a conversation history, determining a category of a question, and generating a response to the question. The NLG module 1640 may convert a response written in a computer language into a natural language that can be understood by humans. The TTS module 1650 may convert the text into a speech signal.

According to an embodiment of the disclosure, the NLU module 1620 of FIG. 16 may interpret the text obtained from a user's utterance by performing preprocessing (1621), performing embedding (1623), applying a temporal expression extraction model (1625), and applying a time point prediction model (1627).

In operation 1621 of performing the preprocessing, the speech recognition module 1530 may remove special characters included in the text, unify synonyms into a single word, and perform morphological analysis through part-of-speech (POS) tagging. In operation 1623 of performing the embedding, the speech recognition module 1530 may perform the embedding on the preprocessed text. In the operation 1623, the speech recognition module 1530 may map the preprocessed text to a plurality of vectors.

In operation 1625 of applying the temporal expression extraction model, the speech recognition module 1530 may extract a temporal expression included in the text obtained from the user's utterance input, based on a result of the embedding. In operation 1627 of applying the time point prediction model, the speech recognition module 1530 may predict the extent to which the extracted temporal expression represents the past with respect to a current time point.

Operations 1625 and 1627 of applying the temporal expression extraction model and applying the time point prediction model will be described in greater detail below with reference to FIGS. 17 and 18.

Figure 17:
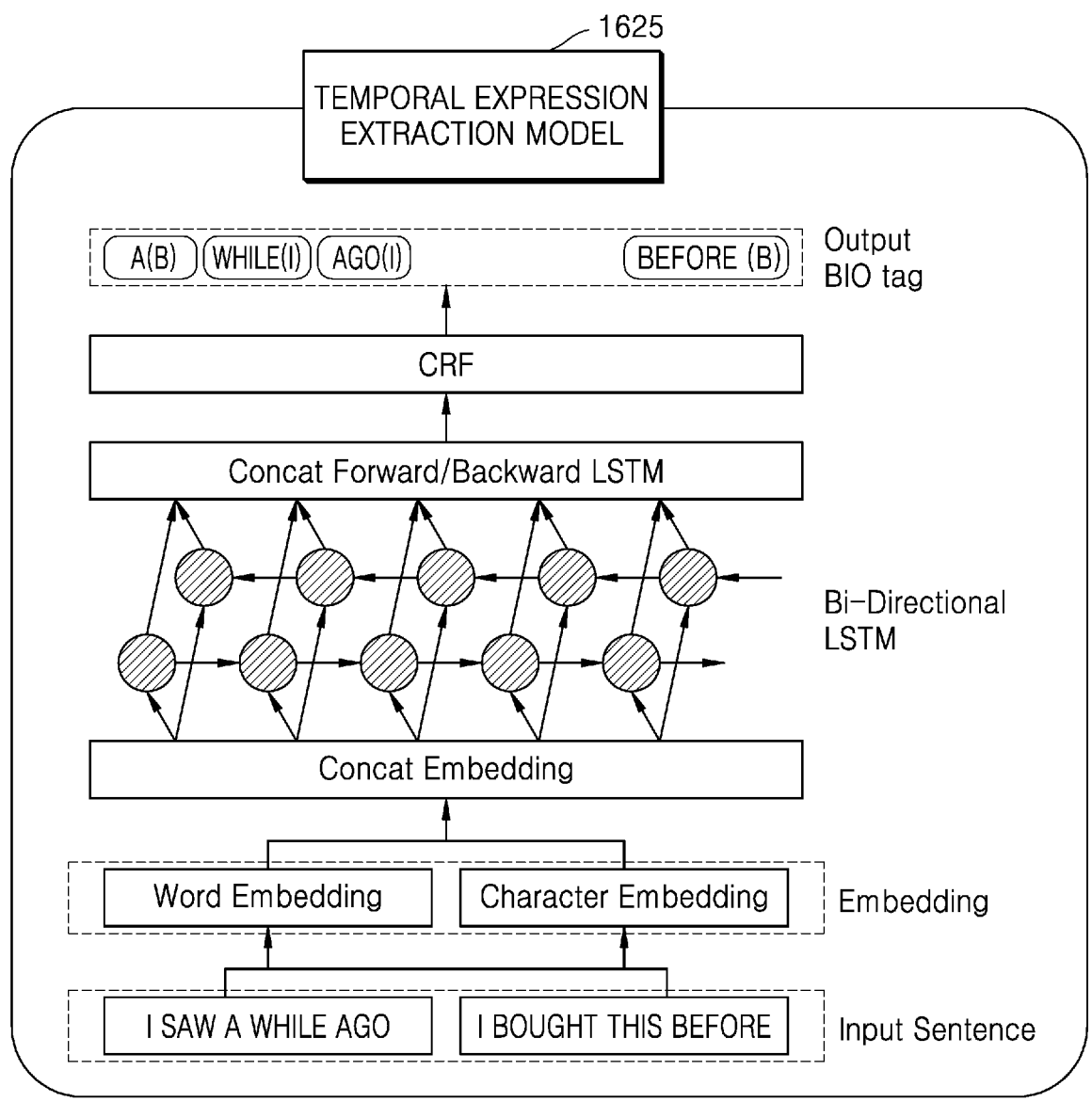
FIG. 17 is a diagram illustrating an example temporal expression extraction model according to an embodiment of the disclosure.

FIG. 17 is a diagram illustrating an example temporal expression extraction model (e.g., including various processing circuitry and/or executable program elements) according to an embodiment of the disclosure.

For example, applying the temporal expression extraction model 1625 may include processing input data according to an AI model shown in FIG. 17.

According to an embodiment of the disclosure, the speech recognition module 1530 may receive a text obtained by converting an utterance input as an input sentence. The speech recognition module 1530 may embed the input sentence in units of a word and/or character. The speech recognition module 1530 may perform concatenated embedding in order to use a word embedding result and a character embedding result together. The speech recognition module 1530 may generate conditional random fields (CRFs) by applying a bidirectional LSTM model to the text mapped to a plurality of vectors.

The speech recognition module 1530 may generate a CRF by applying a probability-based tagging model under predetermined conditions. According to an embodiment of the disclosure, the speech recognition module 1530 may pre-learn conditions in which a word, stem or morpheme is more likely to be a temporal expression, and tag portions having a probability value greater than or equal to a threshold value based on the pre-learned conditions. For example, the speech recognition module 1530 may extract a temporal expression via BIO tagging.

Figure 18:
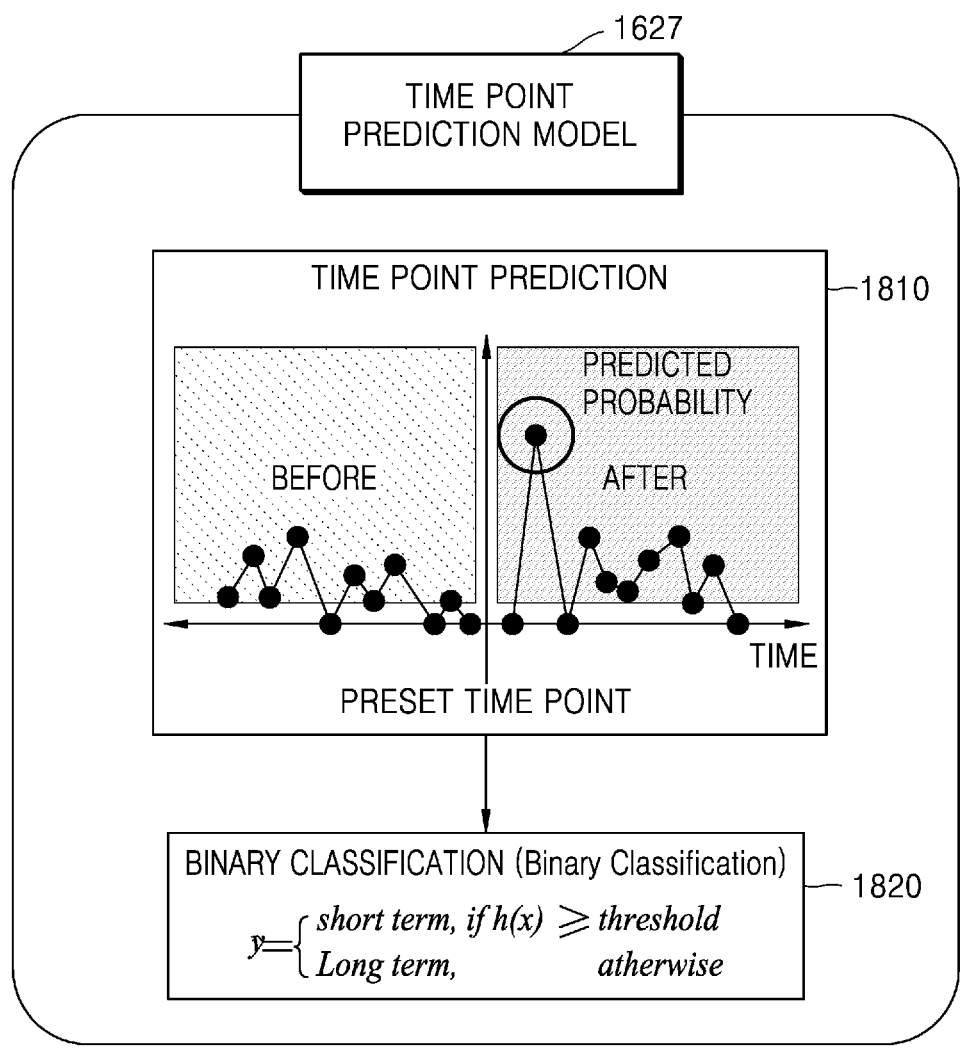
FIG. 18 is a diagram illustrating an example time point prediction model according to an embodiment of the disclosure.

FIG. 18 is a diagram illustrating an example time point prediction model according to an embodiment of the disclosure.

For example, applying the time point prediction model 1627 may include processing input data according to an AI model shown in FIG. 18.

According to an embodiment of the disclosure, the speech recognition module 1530 may determine a time point related to a temporal expression, based on the temporal expression which is identified in a text by a temporal expression extraction model. The speech recognition module 1530 may predict probability values as to what time point is represented by the identified temporal expression and determine a time point having a highest probability value as a time point represented by the temporal expression.

The speech recognition module 1530 may pre-learn time points indicated by various temporal expressions. The speech recognition module 1530 may derive a graph 1810 including probability values, e.g., the probabilities that the identified temporal expression represents a plurality of time points by applying a pre-trained model to the identified temporal expression as an input. In the graph 1810, x- and y-axes may respectively denote a time point and a probability value. The graph 1810 may represent probability values with respect to time points arbitrarily designated at specific time intervals or may show probability values at time points when past utterances were made or at which a conversational service was used.

When the time point related to the temporal expression is determined, the speech recognition module 1530 may perform binary classification 1820 for determining whether the determined time point is before or after the preset time point.

The speech recognition module 1530 may select a first database 261 when it is determined, based on a result of determination via the binary classification 1820, that the time point related to the temporal expression is before the preset time point. The speech recognition module 1530 may select a second database 263 when it is determined, based on the result of determination via the binary classification 1820, that the time point related to the temporal expression is after the preset time point.

According to an embodiment of the disclosure, the speech recognition module 1530 may interpret the text based on a user's conversation history acquired from the selected database. Although FIG. 16 shows only the process in which the NLU module 1620 of the speech recognition module 1530 determines a time point related to an utterance input in a text and select a database based on the time point, the speech recognition module 1530 may perform again an NLU process for interpreting the text based on information about the user's conversation history acquired from the selected database. The NLU module 1620 may specify at least one entity included in the text and interpret the specified text based on the information about the user's conversation history acquired from the selected database.

The DM module 1630 may receive a result of interpreting the specified text via the NLU module 1620 as an input, and output an instruction list for the NLG module 1640 in consideration of state variables such as a conversation history. The NLG module 1640 may generate a response message to a user's utterance input based on the received instruction list.

According to various embodiments of the disclosure, the electronic device 200 may use AI technologies in the overall process for providing a conversational service to the user. Functions related to AI according to the disclosure are operated by a processor and a memory. The processor may include one or more processors. In this case, the one or more processors may be a general-purpose processor such as, for example, and without limitation, a central processing unit (CPU), an application processor (AP), or a digital signal processor (DSP), a dedicated graphics processor such as a graphical processing unit (GPU) or a vision processing unit (VPU), or a dedicated AI processor such as a neural processing unit (NPU). The one or more processors may control input data to be processed according to predefined operation rules or an AI model stored in the memory. When the one or more processors are a dedicated AI processor, the dedicated AI processor may be designed with a hardware structure specialized for processing a specific AI model.

The predefined operation rules or the AI model may be created via a training process. This may refer, for example, to the predefined operation rules or AI model designed to perform desired characteristics (or purpose) being created by training a basic AI model based on a learning algorithm that utilizes a large number of training data. The training process may be performed by a device on which AI is implemented according to an embodiment of the disclosure or a separate server and/or system. Examples of the learning algorithm may include, but are not limited thereto, supervised learning, unsupervised learning, semi-supervised learning, and reinforcement learning.

The AI model may include a plurality of neural network layers. Each of the neural network layers may have a plurality of weight values and may perform neural network computations via arithmetic operations on results of calculations in a previous layer and a plurality of weight values in the current layer. A plurality of weights in each of the neural network layers may be optimized by a result of training the AI model. For example, a plurality of weights may be updated to reduce or minimize a loss or cost value acquired by the AI model during a training process. An artificial neural network may include a deep neural network (DNN) and may include, for example, and without limitation, a convolutional neural network (CNN), a DNN, a recurrent neural network (RNN), a restricted Boltzmann machine (RBM), a deep belief network (DBN), a bidirectional recurrent DNN (BRDNN), deep Q-networks (DQN), or the like, but is not limited thereto.

The embodiments of the disclosure may be implemented as a software program including instructions stored in a computer-readable storage medium.

A computer may refer, for example, to a device configured to retrieve an instruction stored in a computer-readable storage medium and to operate, in response to the retrieved instruction, and may include a terminal device and a remote control device according to embodiments of the disclosure.

The computer-readable storage medium may be provided in the form of a non-transitory storage medium. In this regard, the 'non-transitory' storage medium may not include a signal and is tangible, and the term does not distinguish between data that is semi-permanently stored and data that is temporarily stored in the storage medium.

In addition, the electronic device and method according to embodiments of the disclosure may be provided in the form of a computer program product. The computer program product may be traded, as a product, between a seller and a buyer.

The computer program product may include a software program and a computer-readable storage medium having stored therein the software program. For example, the computer program product may include a product (e.g. a downloadable application) in the form of a software program electronically distributed by a manufacturer of the electronic device or through an electronic market (e.g., Google Play Store™ and App Store™). For such electronic distribution, at least a part of the software program may be stored on the storage medium or may be temporarily generated. The storage medium may be a storage medium of a server of the manufacturer, a server of the electronic market, or a relay server for temporarily storing the software program.

In a system including a server and a terminal (e.g., the terminal device or remote control device), the computer program product may include a storage medium of the server or a storage medium of the terminal. Where a third device (e.g., a smartphone) that communicates with the server or the terminal is present, the computer program product may include a storage medium of the third device. The computer program product may include a software program that is transmitted from the server to the terminal or the third device or that is transmitted from the third device to the terminal.

In this case, one of the server, the terminal, and the third device may execute the computer program product, thereby performing methods according to embodiments of the disclosure. At least two of the server, the terminal, and the third device may execute the computer program product, thereby performing the methods according to embodiments of the disclosure in a distributed manner.

For example, the server (e.g., a cloud server, an AI server, or the like) may execute the computer program product stored in the server, and may control the terminal communicating with the server to perform the methods according to embodiments of the disclosure.

As another example, the third device may execute the computer program product, and may control the terminal communicating with the third device to perform the methods according to embodiments of the disclosure. As a specific example, the third device may remotely control the terminal device or remote control device to transmit or receive a packing image.

In a case where the third device executes the computer program product, the third device may download the computer program product from the server, and may execute the downloaded computer program product. The third device may execute the computer program product that is preloaded therein, and may perform the methods according to the embodiments of the disclosure.

While the disclosure has been illustrated and described with reference to various example embodiments, it will be understood that the various example embodiments are intended to be illustrative, not limiting. One of ordinary skill in the art will understand that various changes in form and detail may be made without departing from the spirit and scope of the disclosure, including the appended claims and their equivalents.

What is claimed is:

1. A method, performed by an electronic device, of providing a conversational service to a user, the method comprising:
   receiving an utterance input;
   identifying a temporal expression representing a time in a text obtained from the utterance input by applying a pre-trained temporal expression extraction model to the obtained text;
   determining a time point related to the utterance input based on the temporal expression, wherein the determined time point related to the utterance input corresponds to a time before the utterance input is received;
   selecting a database corresponding to the determined time point from among a plurality of databases storing information about a conversation history of the user using the conversational service;

interpreting the text based on information about the conversation history of a user, the conversation history information being acquired from the selected database;

generating a response message to the utterance input based on a result of the interpreting; and outputting the generated response message, wherein the plurality of databases comprise a first database storing information about the conversation history of the user accumulated before a preset time point and a second database storing information about the conversation history of the user accumulated after the preset time point, and wherein the selecting of the database corresponding to the determined time point from among the plurality of databases comprises:

selecting the first database from among the plurality of databases based on the determined time point related to the utterance input being before the preset time point; and selecting the second database from among the plurality of databases based on the determined time point related to the utterance input being after the preset time point, and wherein the determining of the time point related to the utterance input comprises:

predicting probability values including probabilities that the temporal expression will represent each of a plurality of time points; and determining a time point, corresponding to a highest probability value from among the predicted probability values, as the time point related to the utterance input.

2. The method of claim 1, wherein the identifying of the temporal expression comprises:

obtaining the text by performing speech recognition on the utterance input; and determining, as the temporal expression, an entity representing at least one of a time point included in the text, a duration included in the text, or a period included in the text.

3. The method of claim 2, wherein the determining of the entity comprises:

performing embedding for mapping the text to a plurality of vectors;

assigning a beginning-inside-outside (BIO) tag to at least one morpheme representing at least one of the time point, the duration, or the period included in the text by applying a bidirectional long short-term memory (LSTM) model to the plurality of vectors; and identifying the entity in the text based on the BIO tag.

4. The method of claim 1, further comprising:

based on ending of a conversation service during which the utterance input is received, transmitting to the first database information about a user's conversation history accumulated in the second database while the conversation service was provided.

5. The method of claim 1, wherein the first database is stored in an external server, and the second database is stored in the electronic device, and wherein the preset time point includes one of a time point based on at least some of the information about the conversation history of the user, included in the second database, being transmitted to the first database, a time point based on a face image of the user being obtained, and a time point based on the conversational service starting.

6. The method of claim 1, wherein the interpreting of the text comprises:

determining an entity included in the text that needs to be specified;

acquiring specification information for specifying the determined entity by retrieving the information about the conversation history of the user, acquired from the selected database; and interpreting the text and the specification information using a natural language understanding (NLU) model.

7. The method of claim 1, wherein the generating of the response message comprises:

determining a type of the response message by applying a dialog manager (DM) model to the result of the interpreting; and generating the response message of the determined type using a natural language generation (NLG) model.

8. The method of claim 1, further comprising:

obtaining a face image of the user;

determining whether a face ID corresponding to the obtained face image is stored by searching the first database included in the plurality of databases; and initiating the conversational service based on a result of the determining.

9. The method of claim 8, wherein the initiating of the conversational service comprises:

based on the face ID corresponding to the obtained face image being stored in the first database, updating a stored service usage history mapped to the face ID; and based on the face ID corresponding to the obtained face image not being stored in the first database, generating a new face ID and a service usage history mapped to the new face ID.

10. The method of claim 8, further comprising:

transmitting the face ID to another electronic device after the conversational service ends; and transmitting, in response to a request received from the other electronic device, information about the conversation history of the user stored in the second database included in the plurality of databases, to the other electronic device.

11. An electronic device configured to provide a conversational service to a user, the electronic device comprising:

a memory storing one or more instructions; and at least one processor configured to execute the one or more instructions to provide the conversational service to the user, wherein the at least one processor is further configured to execute the one or more instructions to control the electronic device to:

receive an utterance input; identify a temporal expression representing a time in a text obtained from the utterance input by applying a pre-trained temporal expression extraction model to the obtained text; determine a time point related to the utterance input based on the temporal expression, wherein the determined time point related to the utterance input corresponds to a time before the utterance input is received; select a database corresponding to the determined time point from among a plurality of databases storing information about a conversation history of the user using the conversational service; interpret the text based on information about the conversation history of the user, the conversation history information being acquired from the selected database; generate a response message to the utterance input based on a result of the interpreting; and output the generated response message, wherein the plurality of databases comprise a first database storing information about the conversation history of the user accumulated before a preset time point and a second database storing information about the conversation history of the user accumulated after the preset time point, and wherein the selecting of the database corresponding to the determined time point from among the plurality of databases comprises:

selecting the first database from among the plurality of databases based on the determined time point related to the utterance input being before the preset time point; and selecting the second database from among the plurality of databases based on the determined time point related to the utterance input being after the preset time point, and wherein the determining of the time point related to the utterance input comprises:

predicting probability values including probabilities that the temporal expression will represent each of a plurality of time points; and determining a time point, corresponding to a highest probability value from among the predicted probability values, as the time point related to the utterance input.

12. The electronic device of claim 11, wherein the at least one processor is further configured to execute the one or more instructions to control the electronic device to:

obtain the text by performing speech recognition on the utterance input; perform embedding for mapping the text to a plurality of vectors; assign a beginning-inside-outside (BIO) tag to at least one morpheme representing at least one of a time point included in the text, a duration included in the text, or a period included in the text by applying a bidirectional long short-term memory (LSTM) model to the plurality of vectors; and determine, based on the BIO tag, an entity representing at least one of the time point, the duration, or the period included in the text as the temporal expression.

13. The electronic device of claim 11, wherein the at least one processor is further configured to control the electronic device to:

based on ending of a conversation service during which the utterance input is received, transmit to the first database information about a user's conversation history accumulated in the second database while the conversation service was provided.

14. The electronic device of claim 11, wherein the first database is stored in an external server, and the second database is stored in the electronic device, and wherein the preset time point includes one of a time point based on at least some of the information about the conversation history of the user, included in the second database, being transmitted to the first database, a time point based on a face image of the user being obtained, and a time point based on the conversational service starting.

15. The electronic device of claim 11, wherein the at least one processor is further configured to execute the one or more instructions to control the electronic device to:

determine an entity included in the text that needs to be specified; acquire specification information for specifying the determined entity by retrieving the information about the conversation history of the user, the conversation history information being acquired from the selected database; interpret the text and the specification information using a natural language understanding (NLU) model;

determine a type of the response message by applying a dialog manager (DM) model to the result of the interpreting; and generate the response message of the determined type using a natural language generation (NLG) model.

16. The electronic device of claim 11, further comprising:

a camera configured to obtain a face image of the user; and a microphone configured to receive the utterance input, wherein before initiating the conversational service, the at least one processor is further configured to execute the one or more instructions to control the electronic device to:

determine whether a face ID corresponding to the obtained face image is stored by searching the first database included in the plurality of databases;

based on the face ID corresponding to the obtained face image being stored in the first database, update a stored service usage history mapped to the face ID; and based on the face ID corresponding to the obtained face image not being stored in the first database, generating a new face ID and a service usage history mapped to the new face ID.

17. The electronic device of claim 16, further comprising a communication interface comprising communication circuitry configured to: transmit the face ID to another electronic device after the conversational service ends and transmit, in response to a request received from the other electronic device, information about the conversation history of the user stored in the second database included in the plurality of databases, to the other electronic device.

18. A non-transitory computer-readable recording medium having stored therein a program that, when executed, causes an electronic device to perform operations for providing a conversational service to a user, the operations comprising:

receiving an utterance input;

identifying a temporal expression representing a time in a text obtained from the utterance input by applying a pre-trained temporal expression extraction model to the obtained text;

determining a time point related to the utterance input based on the temporal expression, wherein the time point related to the utterance input corresponds to a time before the utterance input is received;

selecting a database corresponding to the determined time point from among a plurality of databases storing information about a conversation history of the user using the conversational service;

interpreting the text based on information about the conversation history of the user, the conversation history information being acquired from the selected database;

generating a response message to the utterance input based on a result of the interpreting; and outputting the generated response message, wherein the plurality of databases comprise a first database storing information about the conversation history of the user accumulated before a preset time point and a second database storing information about the conversation history of the user accumulated after the preset time point, and wherein the selecting of the database corresponding to the determined time point from among the plurality of databases comprises:
selecting the first database from among the plurality of databases based on the determined time point related to the utterance input being before the preset time point; and
selecting the second database from among the plurality of databases based on the determined time point related to the utterance input being after the preset time point, and
wherein the determining of the time point related to the utterance input comprises:
predicting probability values including probabilities that the temporal expression will represent each of a plurality of time points; and
determining a time point, corresponding to a highest probability value from among the predicted probability values, as the time point related to the utterance input.

* * * * *